(12) United States Patent
Yang

(10) Patent No.: US 11,289,981 B2
(45) Date of Patent: Mar. 29, 2022

(54) FRAME DEVICE OF IRON CORE OF STATIC ELECTRICAL MACHINE HAVING OUTWARDLY-EXTENDED HEAT DISSIPATION FINS AND/OR HEAT DISSIPATION HOLE

(71) Applicant: Tai-Her Yang, Dzan-Hwa (TW)

(72) Inventor: Tai-Her Yang, Dzan-Hwa (TW)

(*) Notice: Subject to any disclaimer, the term of this patent is extended or adjusted under 35 U.S.C. 154(b) by 215 days.

(21) Appl. No.: 16/104,300

(22) Filed: Aug. 17, 2018

(65) Prior Publication Data

US 2020/0059136 A1 Feb. 20, 2020

(51) Int. Cl.
| | |
|---|---|
| *H01F 27/08* | (2006.01) |
| *H02K 9/22* | (2006.01) |
| *H02K 1/06* | (2006.01) |
| *H01F 27/26* | (2006.01) |
| *H01F 27/06* | (2006.01) |

(52) U.S. Cl.
CPC .............. *H02K 9/22* (2013.01); *H01F 27/266* (2013.01); *H02K 1/06* (2013.01); *H01F 27/06* (2013.01); *H01F 27/08* (2013.01); *H02K 2203/12* (2013.01)

(58) Field of Classification Search
CPC ......... H02K 9/22; H02K 1/06; H02K 2203/12
USPC ............................................ 336/210, 55, 61
See application file for complete search history.

(56) References Cited

U.S. PATENT DOCUMENTS

| | | | | | |
|---|---|---|---|---|---|
| 1,524,591 | A | * | 1/1925 | Starr ....................... | H01F 19/02 336/65 |
| 2,372,067 | A | * | 3/1945 | Forbes ................... | H01F 27/263 336/210 |
| 2,494,350 | A | * | 1/1950 | Mittermaier .......... | H01F 27/263 336/210 |
| 2,680,219 | A | * | 6/1954 | Gould ..................... | H01F 27/02 336/67 |
| 2,825,449 | A | * | 3/1958 | Britt ...................... | B65D 25/101 206/724 |
| 3,110,873 | A | * | 11/1963 | Mittermaier ............ | H01F 27/33 336/210 |
| 3,662,308 | A | * | 5/1972 | Muschong .............. | H01F 27/33 336/210 |
| 3,668,586 | A | * | 6/1972 | Horbach ................ | H01F 27/263 336/210 |
| 4,888,572 | A | * | 12/1989 | Tinley ................... | H01F 27/027 336/65 |

(Continued)

*Primary Examiner* — Mang Tin Bik Lian
(74) *Attorney, Agent, or Firm* — Bacon & Thomas, PLLC

(57) ABSTRACT

The present invention discloses a frame device of iron core of static electrical machine having outwardly-extended heat dissipation fin and/or heat dissipation hole, in which a frame device is formed with an outwardly-extended heat dissipation fin structure and/or formed with heat dissipation holes at locations defined on adjacent surfaces between the frame device and an iron core with magnetic loops, so that the heat dissipation hole can be served to enlarge the heat dissipation area, directly exposed to an ambient gaseous or liquid environment, of the iron core with the magnetic loops of a static electrical machine, and the outwardly-extended heat dissipation fin structure can be served to enlarge the heat dissipation area to the exterior, thereby allowing the heat dissipation performance of the iron core with the magnetic loops, clamped and fastened by the frame device, to the gaseous or liquid environment to be further enhanced.

36 Claims, 23 Drawing Sheets

(56) References Cited

U.S. PATENT DOCUMENTS

| | | | | |
|---|---|---|---|---|
| 4,890,086 | A * | 12/1989 | Hill | H01F 27/263 |
| | | | | 336/210 |
| 5,289,153 | A * | 2/1994 | Gross | H01F 27/266 |
| | | | | 336/210 |
| 5,592,138 | A * | 1/1997 | Tobben | H01F 27/263 |
| | | | | 336/210 |
| 5,684,446 | A * | 11/1997 | Adkins | H01F 27/02 |
| | | | | 336/196 |
| 5,920,249 | A * | 7/1999 | Huss | H01F 41/00 |
| | | | | 336/197 |
| 6,933,823 | B2 * | 8/2005 | Chen | H01F 41/10 |
| | | | | 29/602.1 |
| 2002/0057180 | A1 * | 5/2002 | Shirahata | H01F 30/12 |
| | | | | 336/213 |
| 2013/0106547 | A1 * | 5/2013 | Takahashi | H01F 27/306 |
| | | | | 336/60 |
| 2020/0058432 | A1 * | 2/2020 | Yang | H01F 27/28 |

* cited by examiner

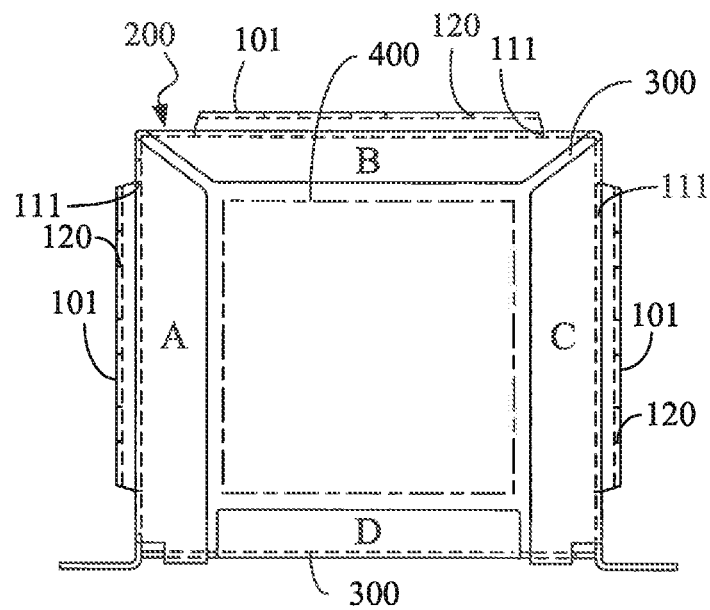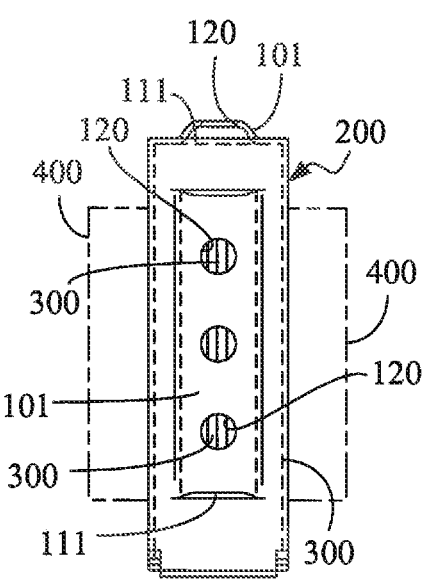
FIG. 19  FIG. 21
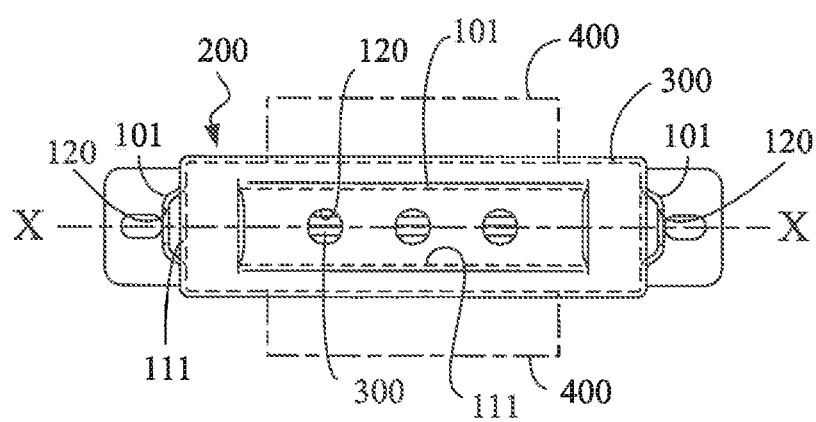
FIG. 20

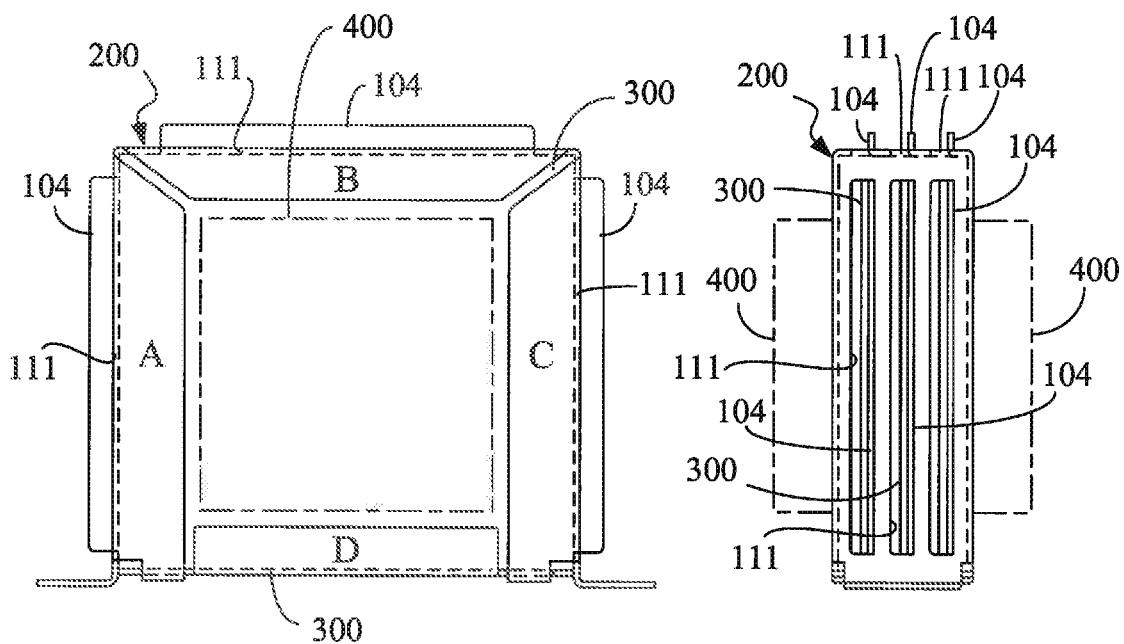
FIG. 39
FIG. 41
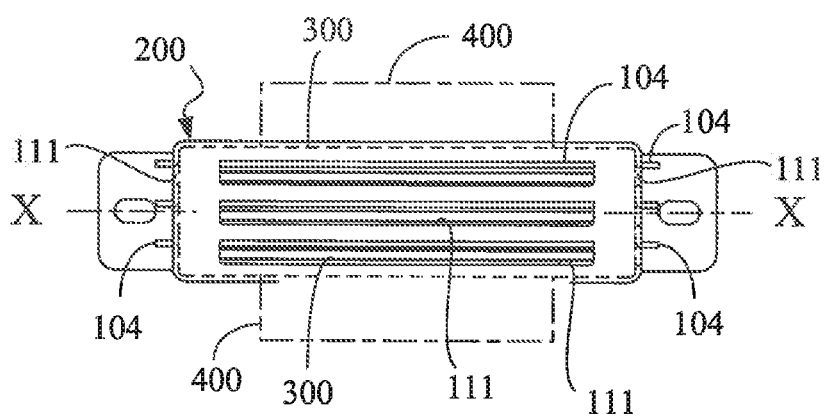
FIG. 40

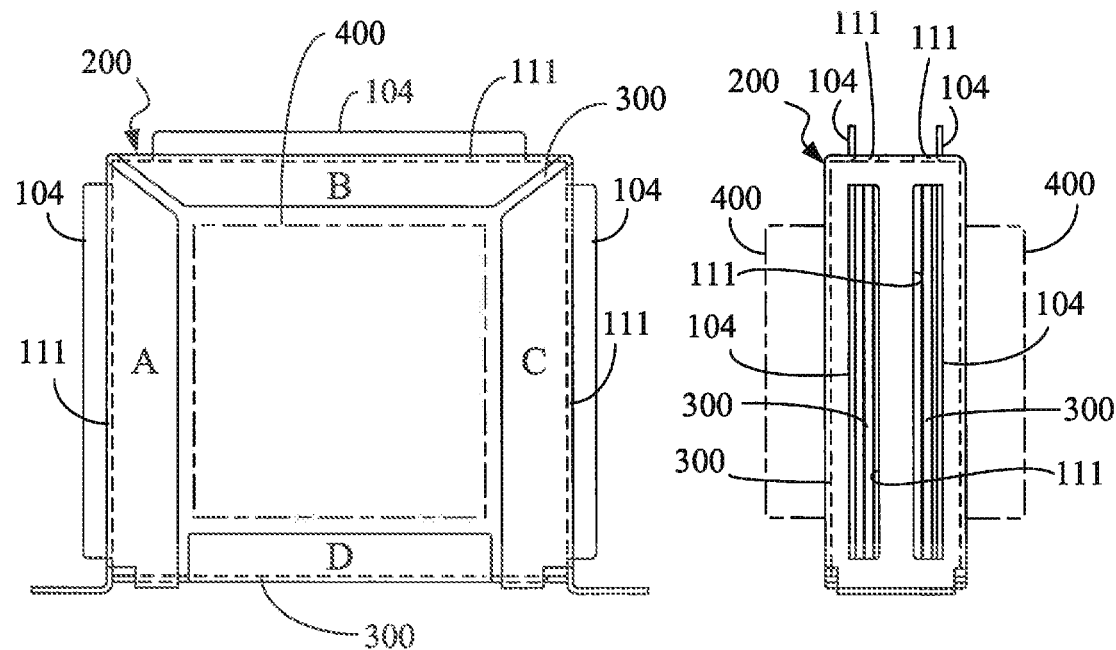
FIG. 42
FIG. 44
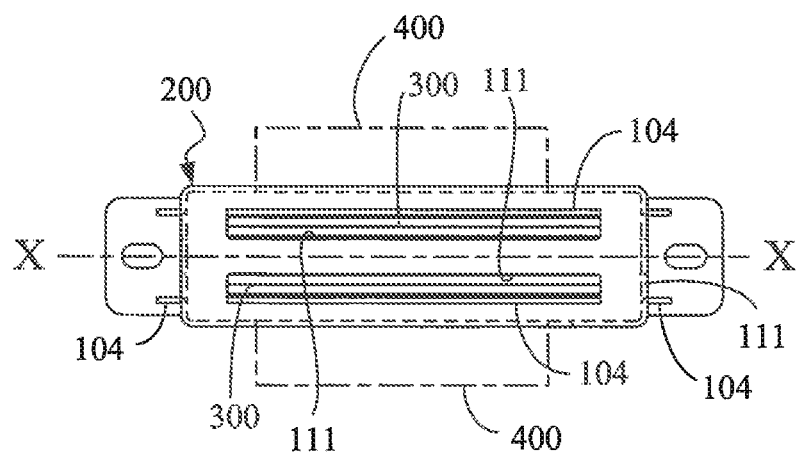
FIG. 43

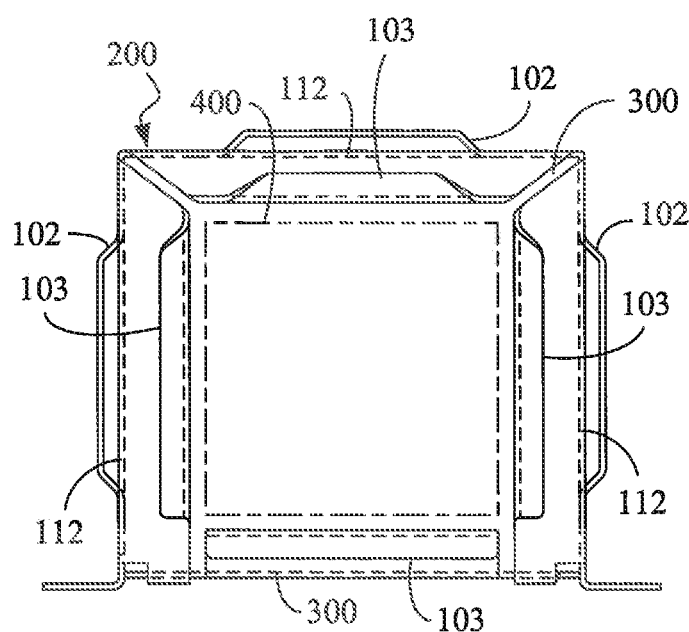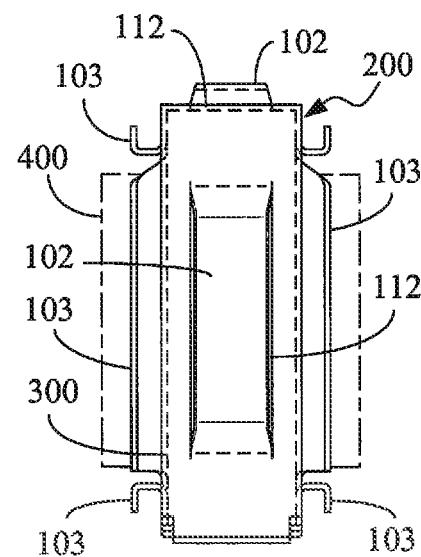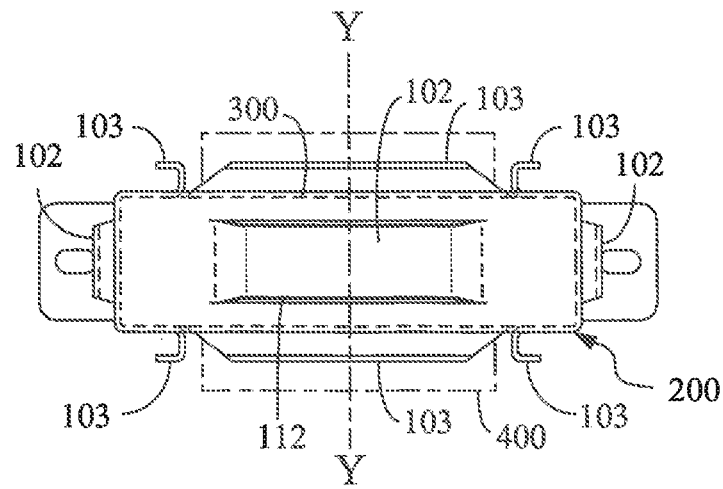
FIG. 51
FIG. 53
FIG. 52

FRAME DEVICE OF IRON CORE OF STATIC ELECTRICAL MACHINE HAVING OUTWARDLY-EXTENDED HEAT DISSIPATION FINS AND/OR HEAT DISSIPATION HOLE

BACKGROUND OF THE INVENTION

(a) Field of the Invention

The present invention discloses a frame device of iron core of static electrical machine having outwardly-extended heat dissipation fin and/or heat dissipation hole, which can be applied in a winding structure consisted of a coil winding set, a BOBBIN, conducting pins and leading wires or a static electrical machine and consisted of an iron core with magnetic loops and installed in a gaseous or a liquid working environment, such as a transformer, an inductor, an electromagnet or a linear displacing actuator adopting the electromagnetic effect, or a device adopting the electromagnetic effect such as a device capable of converting kinetic energy generated via linear and reciprocal displacements into electrical energy for power generation, thereby enhancing the heat dissipation performances of the above-mentioned structures and devices; in the above-mentioned application devices adopting the electromagnetic effect, the iron core with the magnetic loops is often fastened in a frame device made of a heat conducive material so as to be easily assembled or disassembled, the above-mentioned frame device where the iron core with the magnetic loops being disposed therein would shield a surface of the iron core with the magnetic loops which is served to dissipate heat to the exterior, so that a multi-layered structure formed through the above-mention components and devices would generate a greater thermal resistance for the heat transmission, and the heat transmission and the heat dissipation to the exterior performed by the iron core with the magnetic loops would be obstructed, thereby deteriorating the heat dissipation performance.

Instead of being applied in a revolving electrical machine which generates revolving kinetic power, the frame device of iron core of static electrical machine having outwardly-extended heat dissipation fin and/or heat dissipation hole provided by the present invention is aimed to be applied in a frame device which is served to clamp and fasten the outer periphery of the iron core with the magnetic loops of an application device adopting the electromagnetic effect and disposed in a static electrical machine, the frame device disclosed in the frame device of iron core of static electrical machine having outwardly-extended heat dissipation fin and/or heat dissipation hole is formed with an outwardly-extended heat dissipation fin structure and/or formed with heat dissipation holes at locations defined on adjacent surfaces between the frame device and the iron core with the magnetic loops, so that the heat dissipation hole can be served to enlarge the heat dissipation area, directly exposed to an ambient gaseous or liquid environment, of the iron core with the magnetic loops of the static electrical machine, and the outwardly-extended heat dissipation fin can be served to enlarge the heat dissipation area to the exterior, thereby allowing the heat dissipation performance of the iron core with the magnetic loops, clamped and fastened by the frame device, to the ambient gaseous or liquid environment to be further enhanced.

(b) Description of the Prior Art

In a conventional winding structure consisted of a coil winding set, a BOBBIN, conducting pins and leading wires or an application device adopting the electromagnetic effect and consisted of an iron core with magnetic loops and allowing the magnetic flux to pass, for example a static electrical machine such as a transformer, an inductor, an actuator adopting the electromagnetic effect, an electromagnet or an application device adopting the electromagnetic effect such as a device capable of converting kinetic energy generated via displacements into electrical energy for power generation, a frame device made of a heat conducive material is often adopted for fastening, the advantage thereof is that the iron core with the magnetic loops of the electromagnetic application device can be effectively fastened and the winding structure consisted of the coil winding set, the BOBBIN, the conducting pins and the leading wires can be protected, but the disadvantage is that the heat dissipation area of the iron core which is served to dissipate heat to the exterior would be significantly shielded by the frame device, so that the heat dissipation performance of the electromagnetic application device which is served to dissipate heat to the exterior is deteriorated

SUMMARY OF THE INVENTION

It is known that a static electrical machine and a revolving electrical machine are different, the static electrical machine is not provided with a self-revolving function, so that the static electrical machine is unable to drive a cooling fan for assisting the cooling operation like a rotation member formed on a main body of the revolving electrical machine; thus, the raised temperature is a serious problem for the static electrical machine, a severe situation would be the whole electrical machine is broken and a minor situation would is the operation efficiency is decreased, so that it is extremely important for the static electrical machine to be provided with an excellent heat dissipation performance; based on the considerations of the occupied space, the weight and the production cost, one major issue to be solved by the skilled people in the art is to develop a novel heat dissipation performance with lower production cost, smaller volume and capable of assisting the static electrical machine to dissipate heat with a radiating, conducting or convecting means without being additionally provided with a cooling fan or a liquid cooling device;

In a conventional winding structure consisted of a coil winding set, a BOBBIN, conducting pins and leading wires or an application device adopting the electromagnetic effect and consisted of an iron core with magnetic loops and allowing the magnetic flux to pass, for example a static electrical machine such as a transformer, an inductor, an actuator adopting the electromagnetic effect, an electromagnet or an application device adopting the electromagnetic effect such as a device capable of converting kinetic energy generated via displacements into electrical energy for power generation, a frame device made of a heat conducive material is often adopted for fastening, the advantage thereof is that the iron core with the magnetic loops of the electromagnetic application device can be effectively fastened and the winding structure consisted of the coil winding set, the BOBBIN, the conducting pins and the leading wires can be protected, but the disadvantage is that the heat dissipation area of the iron core which is served to dissipate heat to the exterior would be significantly shielded by the frame device, so that the heat dissipation performance of the electromagnetic application device which is served to dissipate heat to the exterior is deteriorated;

instead of being applied in a revolving electrical machine which generates revolving kinetic power, the frame device of iron core of static electrical machine having outwardly-extended heat dissipation fin and/or heat dissipation hole provided by the present invention is aimed to be applied in a frame device which is served to clamp and fasten the outer periphery of the iron core with the magnetic loops of an application device adopting the electromagnetic effect and disposed in a static electrical machine, the frame device disclosed in the frame device of iron core of static electrical machine having outwardly-extended heat dissipation fin and/or heat dissipation hole is formed with an outwardly-extended heat dissipation fin structure and/or formed with heat dissipation holes at locations defined on adjacent surfaces between the frame device and the iron core with the magnetic loops, so that the heat dissipation hole can be served to enlarge the heat dissipation area, directly exposed to an ambient gaseous or liquid environment, of the iron core with the magnetic loops of the static electrical machine, and the outwardly-extended heat dissipation fin can be served to enlarge the heat dissipation area to the exterior, thereby allowing the heat dissipation performance of the iron core with the magnetic loops, clamped and fastened by the frame device, to the ambient gaseous or liquid environment to be further enhanced.

BRIEF DESCRIPTION OF THE DRAWINGS

FIG. 19 is a front view showing the frame device (200) being formed with the transversal (X-X) bridge-type heat dissipation fins (101) and the adjacent transversal (X-X) jointly-formed heat dissipation holes (111), and the transversal (X-X) bridge-type heat dissipation fins (101) being respectively formed with at least one flow discharging hole (120) according to a fifth embodiment of the present invention;

FIG. 20 is a top view of FIG. 19;

FIG. 21 is a side view of FIG. 19:

FIG. 39 is a front view showing the frame device (200) being formed with the at least one transversal (X-X) semi-bridge-type heat dissipation fins (104) arranged at the same side and as multiple rows and the adjacent transversal (X-X) jointly-formed heat dissipation holes (111) according to an eleventh embodiment of the present invention;

FIG. 40 is a top view of FIG. 39;

FIG. 41 is a side view of FIG. 39:

FIG. 42 is a front view showing the frame device (200) being formed the at least one transversal (X-X) semi-bridge-type heat dissipation fin (104) arranged at different sides and as multiple rows and the adjacent transversal (X-X) jointly-formed heat dissipation holes (111) according to a twelfth embodiment of the present invention;

FIG. 43 is a top view of FIG. 42;

FIG. 44 is a side view of FIG. 42:

FIG. 51 is a front view showing the frame device (200) being formed with the longitudinal (Y-Y) bridge-type heat dissipation fins (102) and the adjacent longitudinal (Y-Y) jointly-formed heat dissipation holes (112), and at least one of the outer edges of the adjacent surfaces between the frame device (200) and the iron core of the static electrical machine being formed with the outwardly-bent-from-outer-edge heat dissipation fin (103) in a multi-bending structural status according to a fifteenth embodiment of the present invention;

FIG. 52 is a top view of FIG. 51;

FIG. 53 is a side view of FIG. 51:

DESCRIPTION OF MAIN COMPONENTS SYMBOLS

Figure 1:
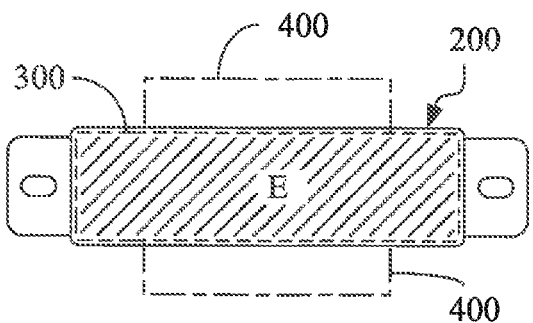
FIG. 1 is a schematic view showing locations where the outwardly-extended heat dissipation fins and/or the heat dissipation holes being formed on a top surface (E) of the frame device (200) of the iron core (300) with the magnetic loops of the static electrical machine according to the present invention.

101: Transversal (X-X) bridge-type heat dissipation fin
102: Longitudinal (Y-Y) bridge-type heat dissipation fin
103: Outwardly-bent-from-outer-edge heat dissipation fin
104: Transversal (X-X) semi-bridge-type heat dissipation fin
105: Longitudinal (Y-Y) semi-bridge-type heat dissipation fin
106: Inclined bridge-type heat dissipation fin
107: V-shaped bridge-type heat dissipation fin
111: Transversal (X-X) jointly-formed heat dissipation hole
112: Longitudinal (Y-Y) jointly-formed heat dissipation hole
116: Inclined jointly-formed heat dissipation hole
117: V-shaped jointly-formed heat dissipation hole
120: Flow discharging hole
130: Heat dissipation hole
200: Frame device
300: Iron core with magnetic loops
400: Winding set structure
E: Top surface of frame device
A, B, C, D: Front surface of frame device
F: Left surface of frame device
G: Right surface of frame device
I, J, K, L: Rear surface of frame device
H: Bottom surface of frame device

DETAILED DESCRIPTION OF THE PREFERRED EMBODIMENTS

In a conventional winding structure consisted of a coil winding set, a BOBBIN, conducting pins and leading wires or an application device adopting the electromagnetic effect and consisted of an iron core with magnetic loops and allowing the magnetic flux to pass, for example a static electrical machine such as a transformer, an inductor, an actuator adopting the electromagnetic effect, an electromagnet or an application device adopting the electromagnetic effect such as a device capable of converting kinetic energy generated via displacements into electrical energy for power generation, a frame device made of a heat conducive material is often adopted for fastening, the advantage thereof is that the iron core with the magnetic loops of the electromagnetic application device can be effectively fastened and the winding structure consisted of the coil winding set, the BOBBIN, the conducting pins and the leading wires can be protected, but the disadvantage is that the heat dissipation area of the iron core which is served to dissipate heat to the exterior would be significantly shielded by the frame device, so that the heat dissipation performance of the electromagnetic application device which is served to dissipate heat to the exterior is deteriorated The present invention discloses a frame device of iron core of static electrical machine having outwardly-extended heat dissipation fin and/or heat dissipation hole, which can be applied in a winding structure consisted of a coil winding set, a BOBBIN, conducting pins and leading wires or a static electrical machine and consisted of an iron core with magnetic loops and installed in a gaseous or a liquid working environment, such as a transformer, an inductor, an electromagnet or a linear displacing actuator adopting the electromagnetic effect, or a device adopting the electromagnetic effect such as a device capable of converting kinetic energy generated via linear and reciprocal displacements into electrical energy for power generation, thereby enhancing the heat dissipation performances of the above-mentioned structures and devices; in the above-mentioned application devices adopting the electromagnetic effect, the iron core with the magnetic loops is often fastened in a frame device made of a heat conducive material so as to be easily assembled or disassembled, the above-mentioned frame device where the iron core with the magnetic loops being disposed therein would shield a surface of the iron core with the magnetic loops which is served to dissipate heat to the exterior, so that a multi-layered structure formed through the above-mention components and devices would generate a greater thermal resistance for the heat transmission, and the heat transmission and the heat dissipation to the exterior performed by the iron core with the magnetic loops would be obstructed, thereby deteriorating the heat dissipation performance.

Instead of being applied in a revolving electrical machine which generates revolving kinetic power, the frame device of iron core of static electrical machine having outwardly-extended heat dissipation fin and/or heat dissipation hole provided by the present invention is aimed to be applied in a frame device which is served to clamp and fasten the outer periphery of the iron core with the magnetic loops of an application device adopting the electromagnetic effect and disposed in a static electrical machine, the frame device disclosed in the frame device of iron core of static electrical machine having outwardly-extended heat dissipation fin and/or heat dissipation hole is formed with an outwardly-extended heat dissipation fin structure and/or formed with heat dissipation holes at locations defined on adjacent surfaces between the frame device and the iron core with the magnetic loops, so that the heat dissipation hole can be served to enlarge the heat dissipation area, directly exposed to an ambient gaseous or liquid environment, of the iron core with the magnetic loops of the static electrical machine, and the outwardly-extended heat dissipation fin can be served to enlarge the heat dissipation area to the exterior, thereby allowing the heat dissipation performance of the iron core with the magnetic loops, clamped and fastened by the frame device, to the ambient gaseous or liquid environment to be further enhanced.

The applicable devices of the present invention are application devices adopting the electromagnetic effect and clamped and fastened in a static electrical machine, such as a transformer, an inductor, an actuator adopting the electromagnetic effect, an electromagnet or a device capable of converting kinetic energy generated via displacements into electrical energy for power generation, the structural appearance thereof is often formed as a three-dimensional polygonal iron core (300) with magnetic loops consisted of sheetlike iron cores (300) with magnetic loops being mutually stacked, or formed with various three-dimensional shapes through sintering block-shaped magnetic conductive powder cores.

According to the present invention, a frame device (200) served to clamp and fasten the iron core (300) with the magnetic loops, which is widely used and has six surfaces at the outer periphery thereof and formed as a square-like member or a rectangular member and adopted as the iron core of the static electrical machine, is provided as an example, the above-mentioned arrangement is to disclose arranged locations of outwardly-extended heat dissipation fin structures and/or arranged locations of heat dissipation holes formed on adjacent surfaces between the frame device (200) and the iron core (300) with the magnetic loops. Detailed illustrations are provided as followings:

FIG. 1 is a schematic view showing locations where the outwardly-extended heat dissipation fins and/or the heat dissipation holes being formed on a top surface (E) of the frame device (200) of the iron core (300) with the magnetic loops of the static electrical machine according to the present invention.

Figure 2:
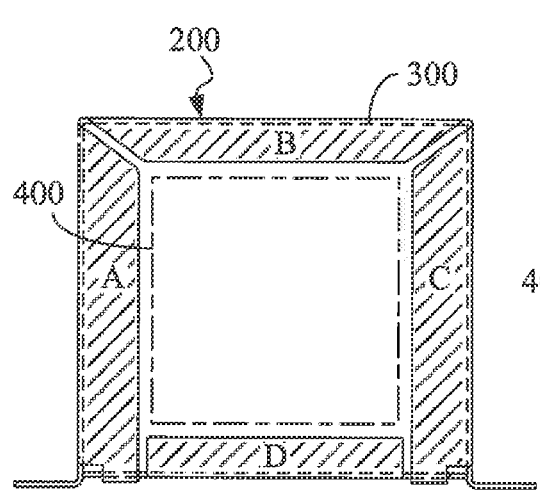
FIG. 2 is a schematic view showing locations where the outwardly-extended heat dissipation fins and/or the heat dissipation holes being formed on front surfaces (A, B, C, D) of the frame device (200) of the iron core (300) with the magnetic loops of the static electrical machine according to the present invention.

FIG. 2 is a schematic view showing locations where the outwardly-extended heat dissipation fins and/or the heat dissipation holes being formed on front surfaces (A, B, C, D) of the frame device (200) of the iron core (300) with the magnetic loops of the static electrical machine according to the present invention.

Figure 3:
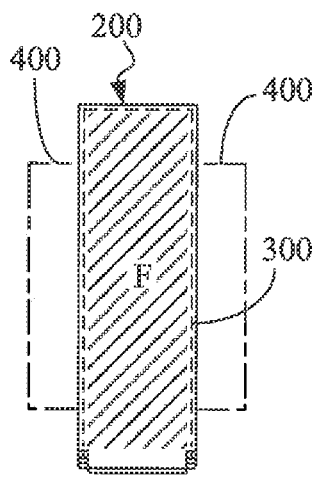
FIG. 3 is a schematic view showing locations where the outwardly-extended heat dissipation fins and/or the heat dissipation holes being formed on a left surface (F) of the frame device (200) of the iron core (300) with the magnetic loops of the static electrical machine according to the present invention.

FIG. 3 is a schematic view showing locations where the outwardly-extended heat dissipation fins and/or the heat dissipation holes being formed on a left surface (F) of the frame device (200) of the iron core (300) with the magnetic loops of the static electrical machine according to the present invention.

Figure 4:
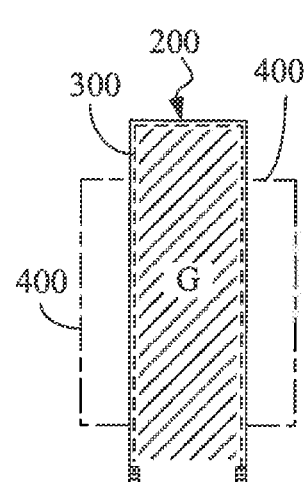
FIG. 4 is a schematic view showing locations where the outwardly-extended heat dissipation fins and/or the heat dissipation holes being formed on a right surface (G) of the frame device (200) of the iron core (300) with the magnetic loops of the static electrical machine according to the present invention.

FIG. 4 is a schematic view showing locations where the outwardly-extended heat dissipation fins and/or the heat dissipation holes being formed on a right surface (G) of the frame device (200) of the iron core (300) with the magnetic loops of the static electrical machine according to the present invention.

Figure 5:
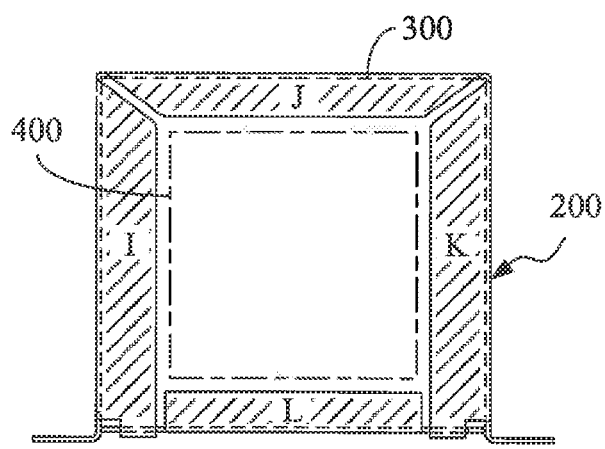
FIG. 5 is a schematic view showing locations where the outwardly-extended heat dissipation fins and/or the heat dissipation holes being formed on rear surfaces (I, J, K, L) of the frame device (200) of the iron core (300) with the magnetic loops of the static electrical machine according to the present invention.

FIG. 5 is a schematic view showing locations where the outwardly-extended heat dissipation fins and/or the heat dissipation holes being formed on rear surfaces (I, J, K, L) of the frame device (200) of the iron core (300) with the magnetic loops of the static electrical machine according to the present invention.

Figure 6:
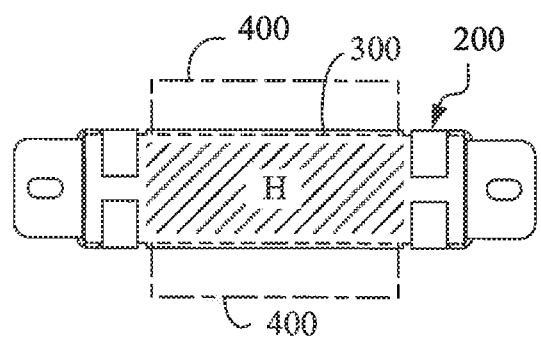
FIG. 6 is a schematic view showing locations where the outwardly-extended heat dissipation fins and/or the heat dissipation holes being formed on a bottom surface (H) of the frame device (200) of the iron core (300) with the magnetic loops of the static electrical machine according to the present invention.

FIG. 6 is a schematic view showing locations where the outwardly-extended heat dissipation fins and/or the heat dissipation holes being formed on a bottom surface (H) of the frame device (200) of the iron core (300) with the magnetic loops of the static electrical machine according to the present invention.

As shown from FIG. 1 to FIG. 6, when the present invention is applied for clamping and fastening the iron core (300) with the magnetic loops formed as the square-like member or the rectangular member, the locations where the outwardly-extended heat dissipation fins and/or the heat dissipation holes (130) being desirably formed are at least one of the locations defined on the top surface, the front surfaces, the left surface, the right surface, the rear surfaces and bottom surface A, B, C, D, E, F, G, H, I, J, K, L, which are defined as the surfaces of the frame device (200) served to clamp and fasten the iron core (300) with the magnetic loops;

when the frame device (200) is served for provide an external locking function to the static electrical machine, the bottom thereof is combined with a fastening surface, the bottom surface is inevitably shielded by the fastening surface, so that the outwardly-extended heat dissipation fins and/or the heat dissipation holes (130) can be optionally and flexibly formed, and at least one of the other surfaces of the frame device (200) is formed the outwardly-extended heat dissipation fins and/or the heat dissipation holes (130).

When the static electrical machine is in a suspended status, at least one of each surface of casing members of each surface of the frame device (200) served to clamp and fasten the iron core (300) with the magnetic loops of the static electrical machine is formed with the outwardly-extended heat dissipation fins and/or the heat dissipation holes (130).

As what is mentioned above, the characteristic of the frame device of iron core of static electrical machine having outwardly-extended heat dissipation fin and/or heat dissipation hole provided by the present invention is that the frame device (200) formed with the outwardly-extended heat dissipation fin and/or the heat dissipation hole allowing heat to the directly dissipate to the exterior is able to configure an optimized structure for enhancing the heat transferring performance of the iron core (300) with the magnetic loops to the ambient gaseous or liquid environment, wherein:

the outwardly-extended heat dissipation fin and the heat dissipation hole includes one or more than one of the followings:

(1) transversal (X-X) bridge-type heat dissipation fin (101);
(2) longitudinal (Y-Y) bridge-type heat dissipation fin (102);
(3) outwardly-bent-from-outer-edge heat dissipation fin (103);
(4) transversal (X-X) semi-bridge-type heat dissipation fin (104);
(5) longitudinal (Y-Y) semi-bridge-type heat dissipation fin (105);
(6) inclined bridge-type heat dissipation fin (106);
(7) V-shaped bridge-type heat dissipation fin (107);
(8) transversal (X-X) jointly-formed heat dissipation hole (111);
(9) longitudinal (Y-Y) jointly-formed heat dissipation hole (112);
(10) inclined jointly-formed heat dissipation hole (116);
(11) V-shaped jointly-formed heat dissipation hole (117); and
(12) heat dissipation hole (130) formed on the adjacent surfaces between the frame device (200) and the iron core (300) with the magnetic loops and allowing the iron core (300) with the magnetic loops to directly dissipate heat to the exterior.

Figures 7, 9:
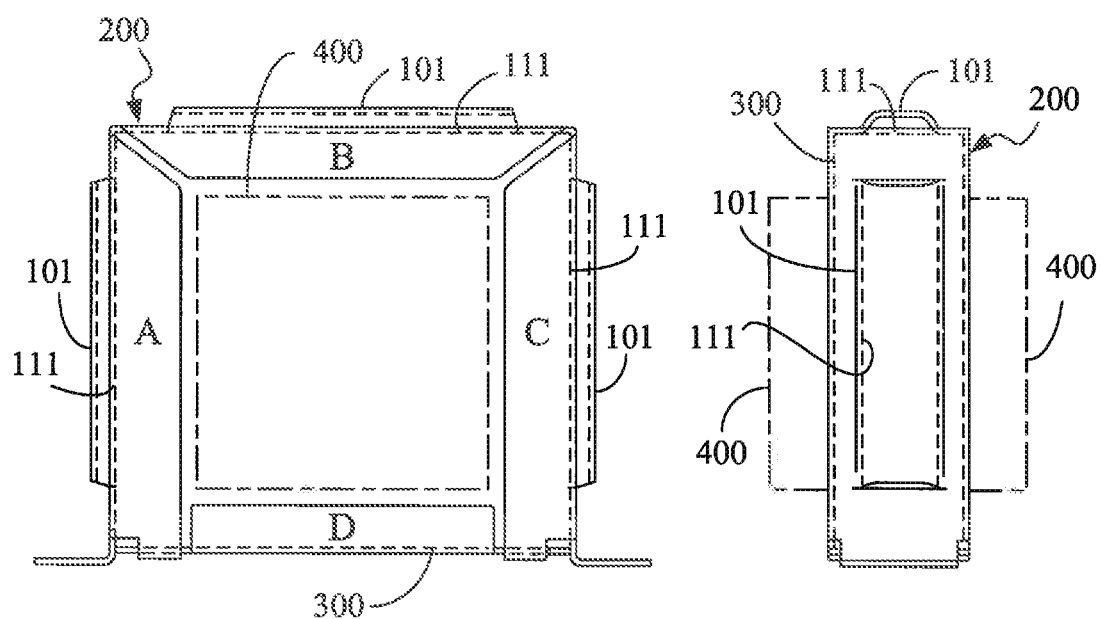
FIG. 7 is a front view showing the frame device (200) being formed with at least one transversal (X-X) bridge-type heat dissipation fin (101) and an adjacent transversal (X-X) jointly-formed heat dissipation hole (111) according to a first embodiment of the present invention.
FIG. 9 is a side view of FIG. 7.

FIG. 7 is a front view showing the frame device (200) being formed with at least one transversal (X-X) bridge-type heat dissipation fin (101) and an adjacent transversal (X-X) jointly-formed heat dissipation hole (111) according to the first embodiment of the present invention.

Figure 8:
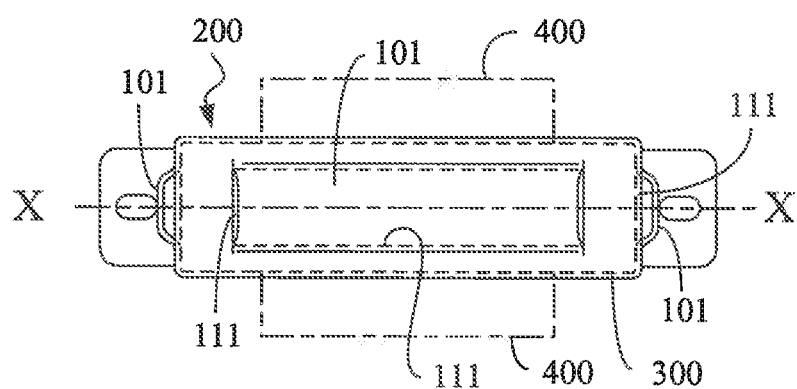
FIG. 8 is a top view of FIG. 7.

FIG. 8 is a top view of FIG. 7.

FIG. 9 is a side view of FIG. 7.

As shown from FIG. 7 to FIG. 9, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the at least one transversal (X-X) bridge-type heat dissipation fin (101) and the adjacent transversal (X-X) jointly-formed heat dissipation hole (111), so that the heat dissipation performance to the ambient gaseous or liquid environment can be enhanced.

Figure 10:
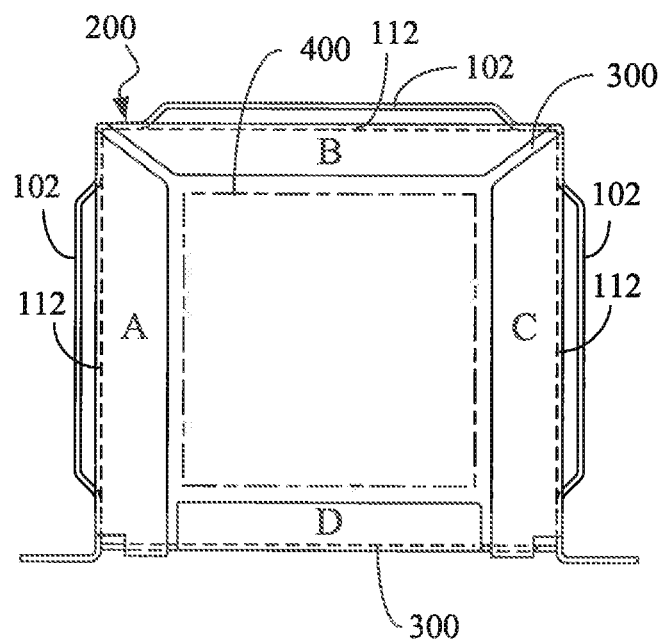
FIG. 10 is a front view showing the frame device (200) being formed with at least one longitudinal (Y-Y) bridge-type heat dissipation fin (102) and an adjacent longitudinal (Y-Y) jointly-formed heat dissipation hole (112) according to a second embodiment of the present invention.

FIG. 10 is a front view showing the frame device (200) being formed with at least one longitudinal (Y-Y) bridge-type heat dissipation fin (102) and an adjacent longitudinal (Y-Y) jointly-formed heat dissipation hole (112) according to the second embodiment of the present invention.

Figure 11:
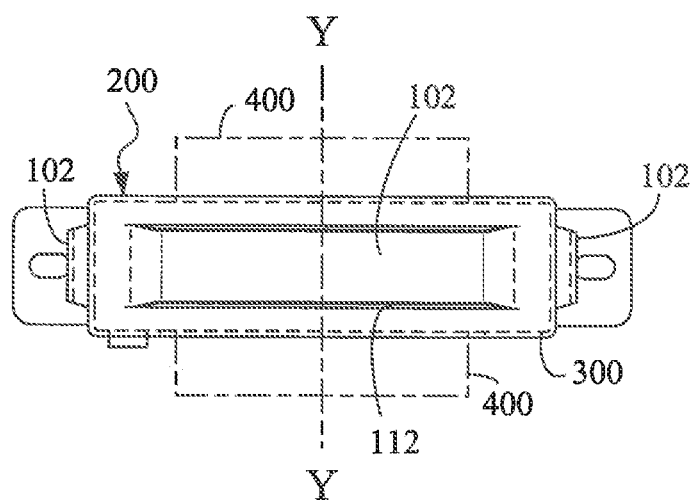
FIG. 11 is a top view of FIG. 10.

FIG. 11 is a top view of FIG. 10.

Figure 12:
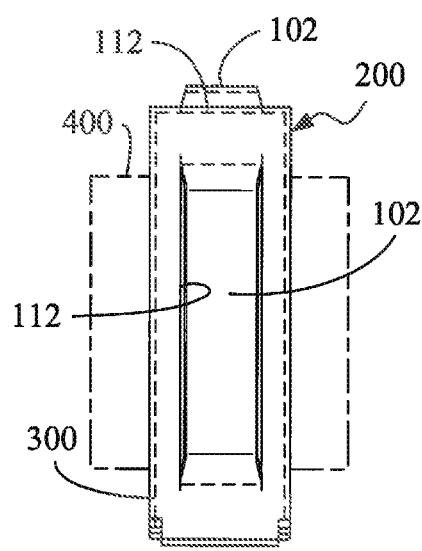
FIG. 12 is a side view of FIG. 10.

FIG. 12 is a side view of FIG. 10.

As shown from FIG. 10 to FIG. 12, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed the at least one longitudinal (Y-Y) bridge-type heat dissipation fin (102) and the adjacent longitudinal (Y-Y) jointly-formed heat dissipation hole (112), so that the heat dissipation performance to the ambient gaseous or liquid environment can be enhanced.

Figure 13:
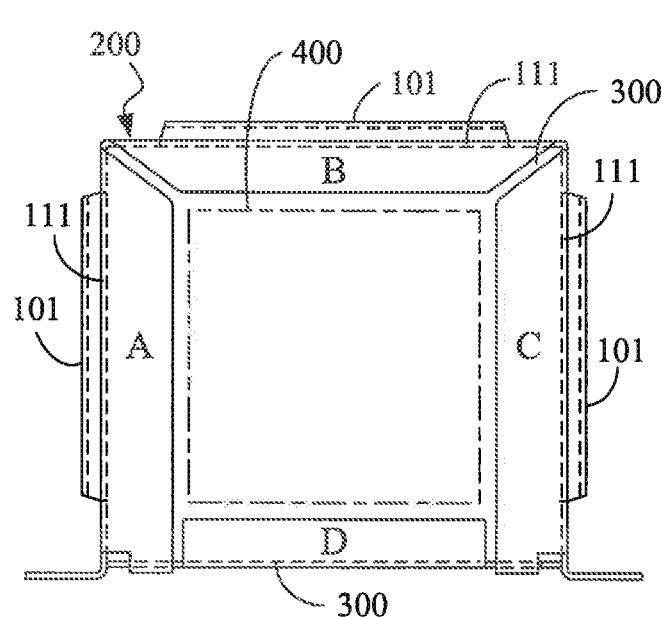
FIG. 13 is a front view showing the frame device (200) being formed with a plurality of the transversal (X-X) bridge-type heat dissipation fins (101) and the adjacent transversal (X-X) jointly-formed heat dissipation holes (111) according to a third embodiment of the present invention.

FIG. 13 is a front view showing the frame device (200) being formed with a plurality of the transversal (X-X) bridge-type heat dissipation fins (101) and the adjacent transversal (X-X) jointly-formed heat dissipation holes (111) according to a third embodiment of the present invention.

Figure 14:
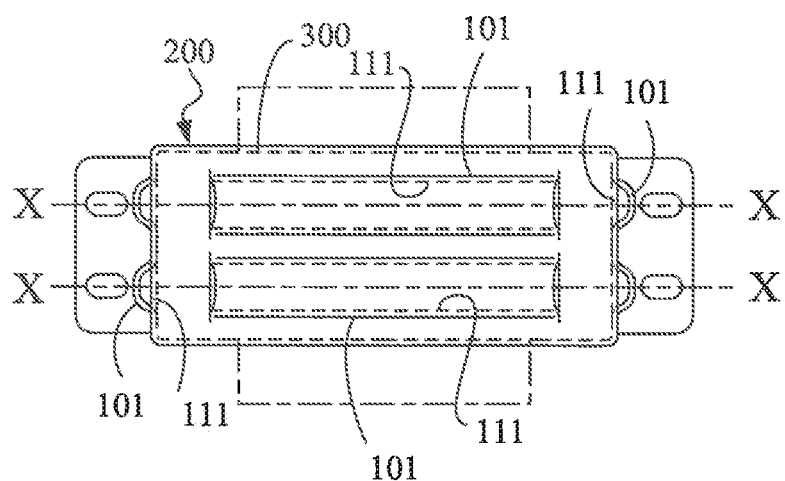
FIG. 14 is a top view of FIG. 13.

FIG. 14 is a top view of FIG. 13.

Figure 15:
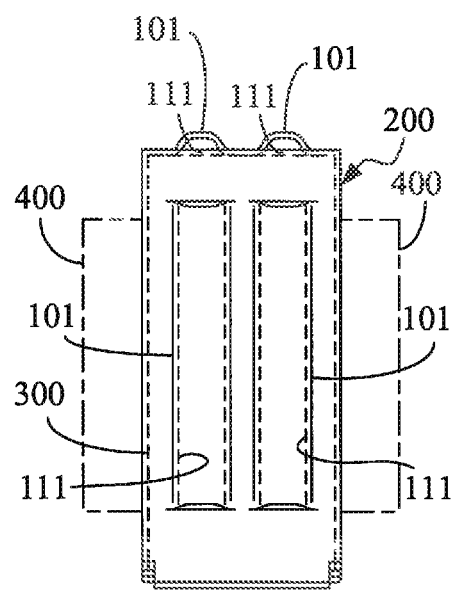
FIG. 15 is a side view of FIG. 13.

FIG. 15 is a side view of FIG. 13.

As shown from FIG. 13 to FIG. 15, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with a plurality of the transversal (X-X) bridge-type heat dissipation fins (101) and the adjacent transversal (X-X) jointly-formed heat dissipation holes (111), so that the heat dissipation performance to the ambient gaseous or liquid environment can be enhanced.

Figures 16, 18:
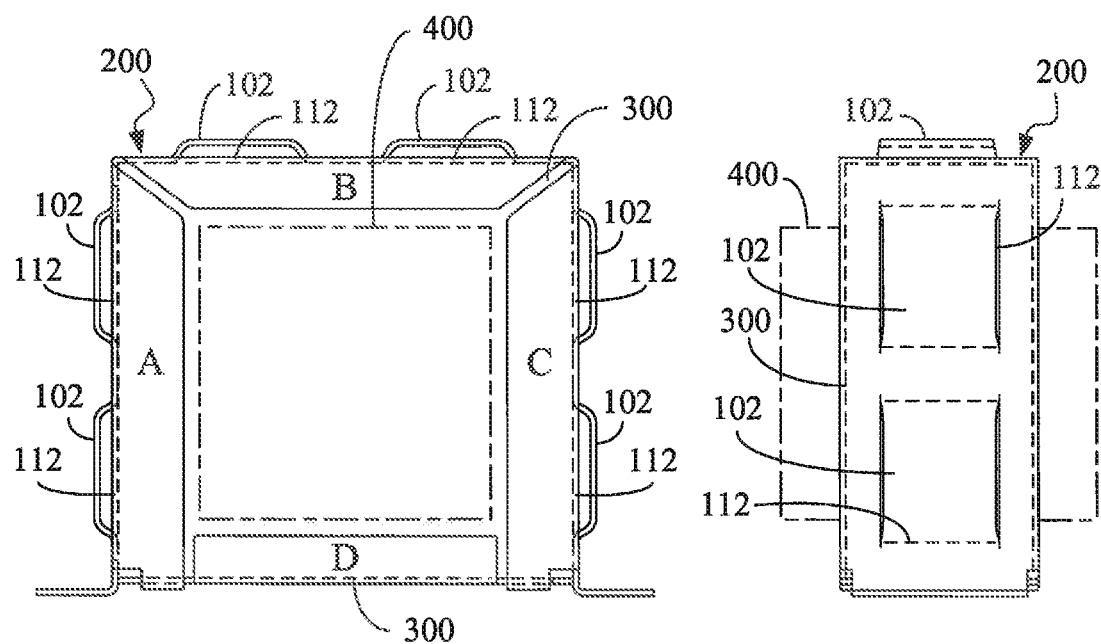
FIG. 16 is a front view showing the frame device (200) being formed with a plurality of the longitudinal (Y-Y) bridge-type heat dissipation fins (102) and the adjacent longitudinal (Y-Y) jointly-formed heat dissipation holes (112) according to a fourth embodiment of the present invention.
FIG. 18 is a side view of FIG. 16.

FIG. 16 is a front view showing the frame device (200) being formed with a plurality of the longitudinal (Y-Y) bridge-type heat dissipation fins (102) and the adjacent longitudinal (Y-Y) jointly-formed heat dissipation holes (112) according to a fourth embodiment of the present invention.

Figure 17:
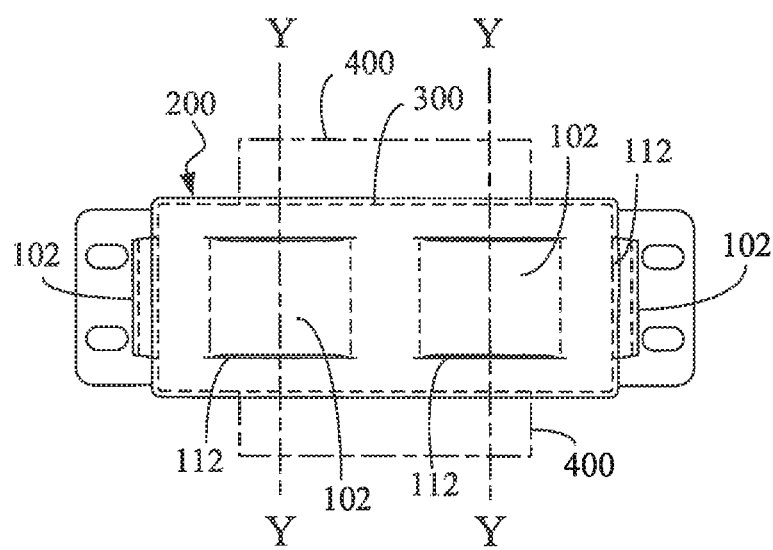
FIG. 17 is a top view of FIG. 16.

FIG. 17 is a top view of FIG. 16.

FIG. 18 is a side view of FIG. 16.

As shown from FIG. 16 to FIG. 18, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with a plurality of the longitudinal (Y-Y) bridge-type heat dissipation fins (102) and the adjacent longitudinal (Y-Y) jointly-formed heat dissipation holes (112), so that the heat dissipation performance to the ambient gaseous or liquid environment can be enhanced.

FIG. 19 is a front view showing the frame device (200) being formed with the transversal (X-X) bridge-type heat dissipation fins (101) and the adjacent transversal (X-X) jointly-formed heat dissipation holes (111), and the transversal (X-X) bridge-type heat dissipation fins (101) being respectively formed with at least one flow discharging hole (120) according to a fifth embodiment of the present invention.

FIG. 20 is a top view of FIG. 19.

FIG. 21 is a side view of FIG. 19.

As shown from FIG. 19 to FIG. 21, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the transversal (X-X) bridge-type heat dissipation fins (101) and the adjacent transversal (X-X) jointly-formed heat dissipation holes (111), and the transversal (X-X) bridge-type heat dissipation fins (101) are respectively formed with the at least one flow discharging hole (120), so that the heat dissipation performance to the ambient gaseous or liquid environment can be enhanced.

Figure 22:
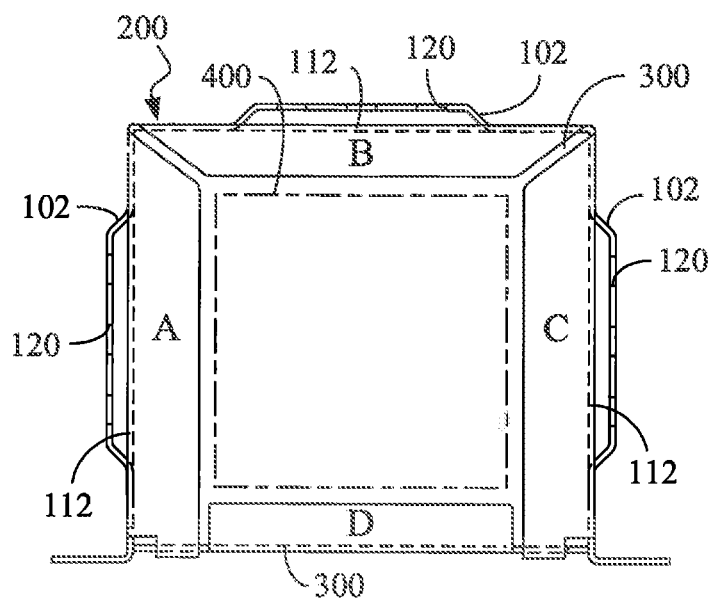
FIG. 22 is a front view showing the frame device (200) being formed with the longitudinal (Y-Y) bridge-type heat dissipation fins (102) and the adjacent longitudinal (Y-Y) jointly-formed heat dissipation holes (112), and the longitudinal (Y-Y) bridge-type heat dissipation fins (102) being respectively formed with the at least one flow discharging hole (120) according to a sixth embodiment of the present invention.

FIG. 22 is a front view showing the frame device (200) being formed with the longitudinal (Y-Y) bridge-type heat dissipation fins (102) and the adjacent longitudinal (Y-Y) jointly-formed heat dissipation holes (112), and the longitudinal (Y-Y) bridge-type heat dissipation fins (102) being respectively formed with the at least one flow discharging hole (120) according to a sixth embodiment of the present invention.

Figure 23:
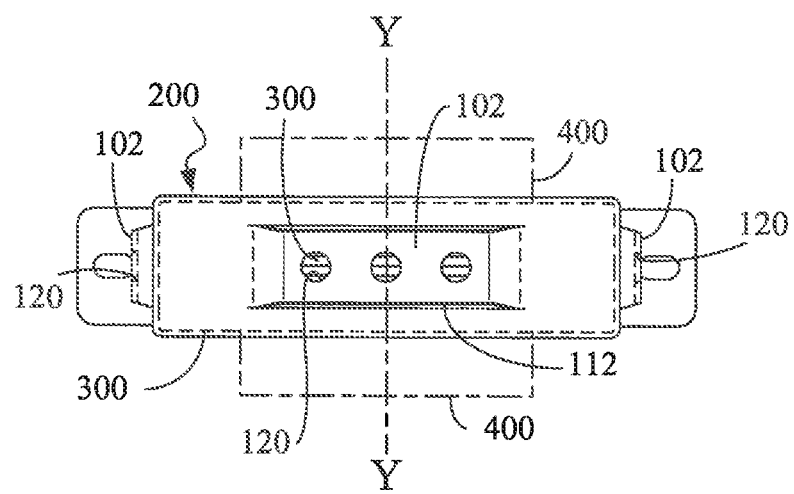
FIG. 23 is a top view of FIG. 22.

FIG. 23 is a top view of FIG. 22.

Figure 24:
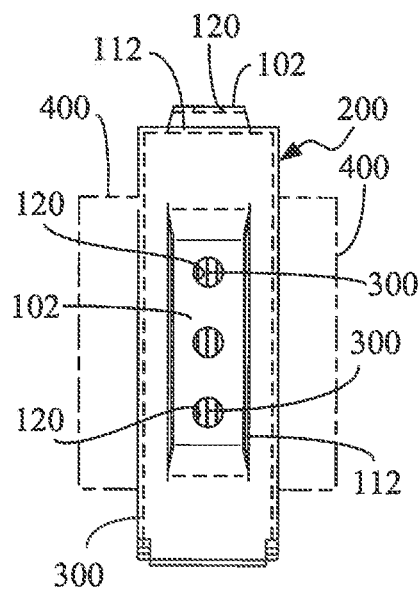
FIG. 24 is a side view of FIG. 22.

FIG. 24 is a side view of FIG. 22.

As shown from FIG. 22 to FIG. 24, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the longitudinal (Y-Y) bridge-type heat dissipation fins (102) and the adjacent longitudinal (Y-Y) jointly-formed heat dissipation holes (112), and the longitudinal (Y-Y) bridge-type heat dissipation fins (102) are respectively formed with the at least one flow discharging hole (120), so that the heat dissipation performance to the ambient gaseous or liquid environment can be enhanced.

Figure 25:
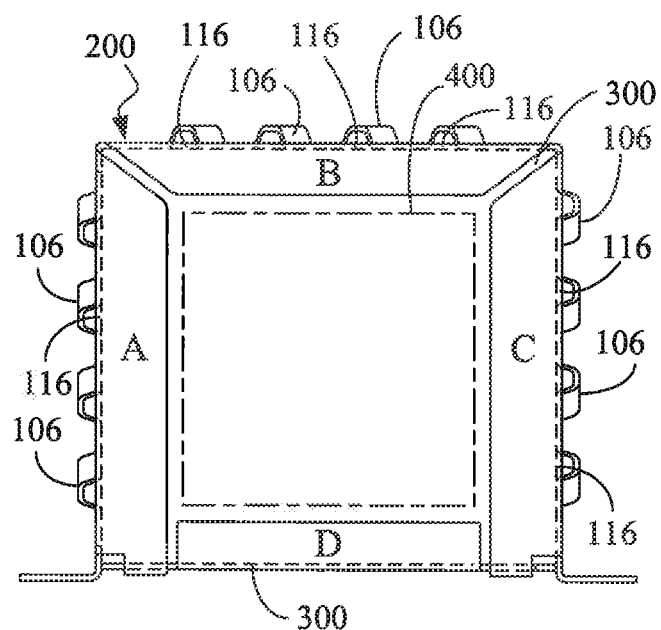
FIG. 25 is a front view showing the frame device (200) being formed with at least one inclined bridge-type heat dissipation fin (106) and an adjacent inclined jointly-formed heat dissipation hole (116) according to a seventh embodiment of the present invention.

According to the present invention, the above mentioned bridge-type heat dissipation fin can be further consisted of an inclined or a V-shaped bridge-type heat dissipation fin structure and a jointly-formed heat dissipation hole. Detailed illustrations are provided as followings:

FIG. 25 is a front view showing the frame device (200) being formed with at least one inclined bridge-type heat dissipation fin (106) and an adjacent inclined jointly-formed heat dissipation hole (116) according to a seventh embodiment of the present invention.

Figure 26:
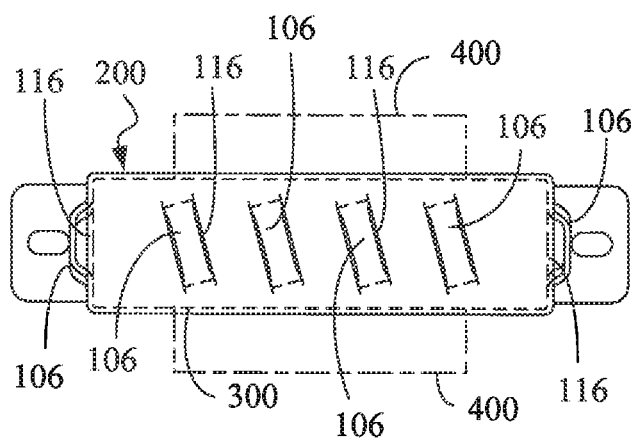
FIG. 26 is a top view of FIG. 25.

FIG. 26 is a top view of FIG. 25.

Figure 27:
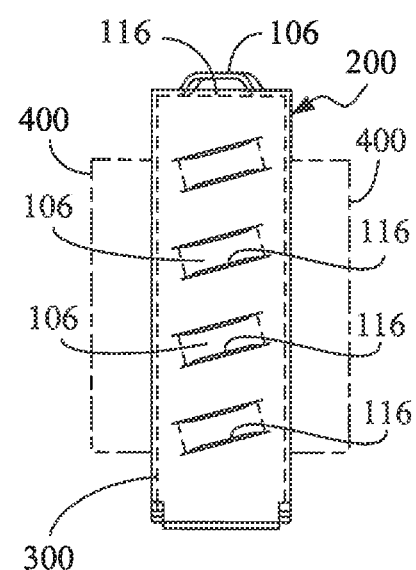
FIG. 27 is a side view of FIG. 25.

FIG. 27 is a side view of FIG. 25.

As shown from FIG. 25 to FIG. 27, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the at least one inclined bridge-type heat dissipation fin (106) and the adjacent inclined jointly-formed heat dissipation hole (116), so that the heat dissipation performance to the ambient gaseous or liquid environment can be enhanced.

Figures 28, 30:
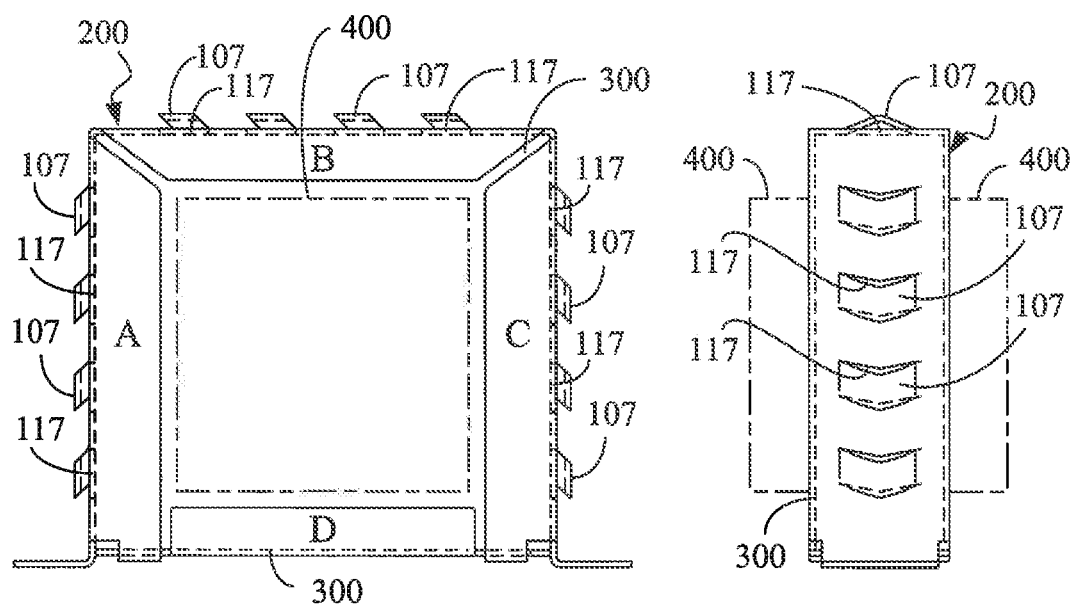
FIG. 28 is a front view showing the frame device (200) being formed with at least one V-shaped bridge-type heat dissipation fin (107) and an adjacent V-shaped jointly-formed heat dissipation hole (117) according to an eighth embodiment of the present invention.
FIG. 30 is a side view of FIG. 28.

FIG. 28 is a front view showing the frame device (200) being formed with at least one V-shaped bridge-type heat dissipation fin (107) and an adjacent V-shaped jointly-formed heat dissipation hole (117) according to an eighth embodiment of the present invention.

Figure 29:
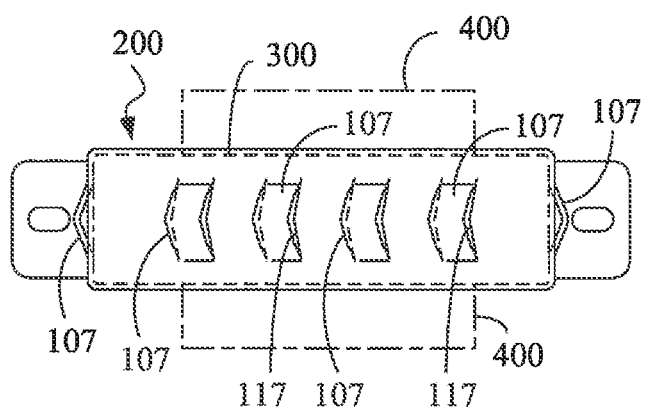
FIG. 29 is a top view of FIG. 28.

FIG. 29 is a top view of FIG. 28.

FIG. 30 is a side view of FIG. 28.

As shown from FIG. 28 to FIG. 30, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface is formed of the frame device (200) with the at least one V-shaped bridge-type heat dissipation fin (107) and the adjacent V-shaped jointly-formed heat dissipation hole (117), so that the heat dissipation performance to the ambient gaseous or liquid environment can be enhanced.

Figure 31:
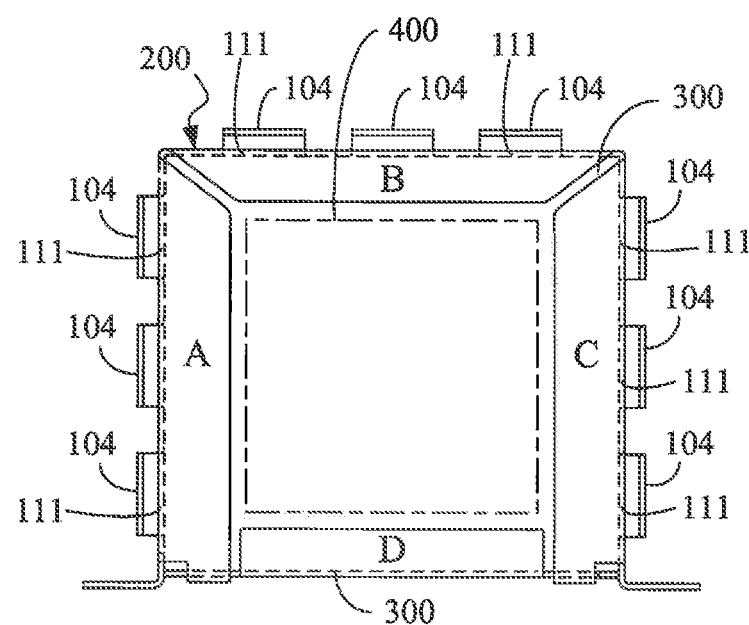
FIG. 31 is a front view showing the frame device (200) being formed with a plurality of transversal (X-X) semi-bridge-type heat dissipation fins (104) and the adjacent transversal (X-X) jointly-formed heat dissipation holes (111) according to a ninth embodiment of the present invention.

According to the present invention, the frame device of iron core of static electrical machine having outwardly-extended heat dissipation fin and/or heat dissipation hole can be further formed with at least one semi-bridge-type heat dissipation fin and at least one jointly-formed heat dissipation hole. Detailed illustrations are provided as followings:

FIG. 31 is a front view showing the frame device (200) being formed with a plurality of transversal (X-X) semi-bridge-type heat dissipation fins (104) and the adjacent transversal (X-X) jointly-formed heat dissipation holes (111) according to a ninth embodiment of the present invention.

Figure 32:
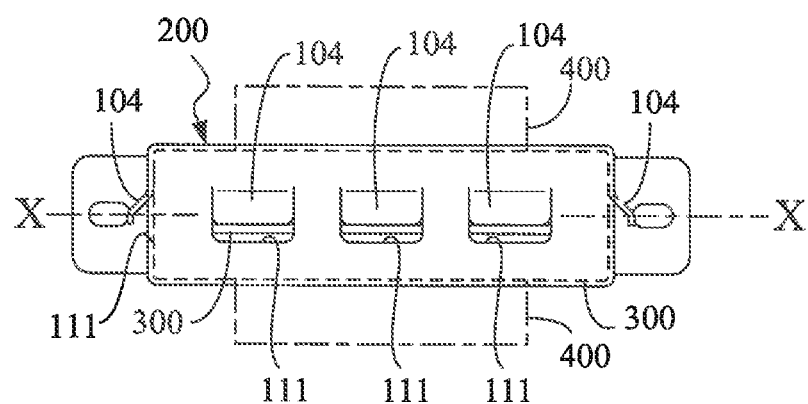
FIG. 32 is a top view of FIG. 31.

FIG. 32 is a top view of FIG. 31.

Figure 33:
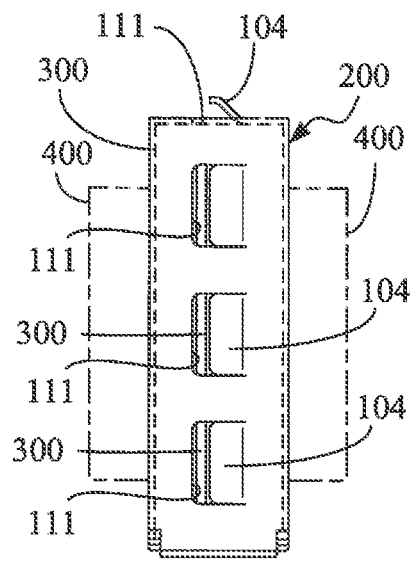
FIG. 33 is a side view of FIG. 31.

FIG. 33 is a side view of FIG. 31.

As shown from FIG. 31 to FIG. 33, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with a plurality of the transversal (X-X) semi-bridge-type heat dissipation fins (104) and the adjacent transversal (X-X) jointly-formed heat dissipation holes (111), so that the heat dissipation performance to the ambient gaseous or liquid environment can be enhanced.

Figure 34:
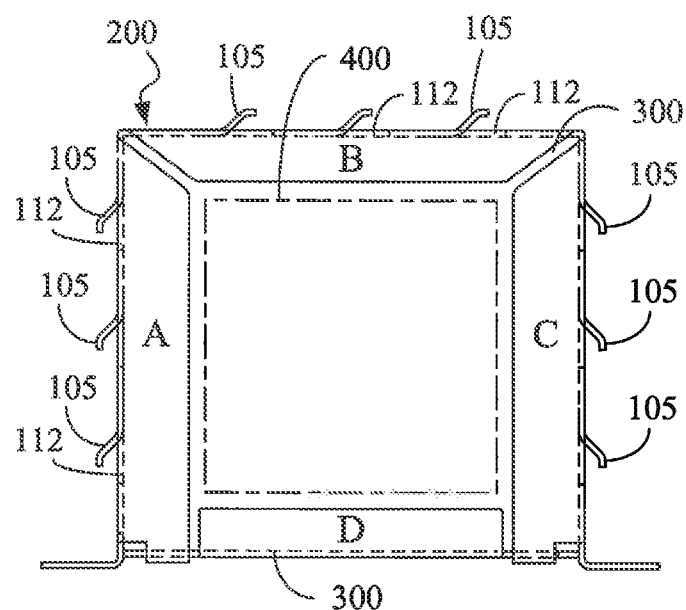
FIG. 34 is a front view showing the frame device (200) being formed with a plurality of longitudinal (Y-Y) semibridge-type heat dissipation fins (105) and the adjacent longitudinal (Y-Y) jointly-formed heat dissipation holes (112) according to a tenth embodiment of the present invention.

FIG. 34 is a front view showing the frame device (200) being formed with a plurality of longitudinal (Y-Y) semi-bridge-type heat dissipation fins (105) and the adjacent longitudinal (Y-Y) jointly-formed heat dissipation holes (112) according to a tenth embodiment of the present invention.

Figure 35:
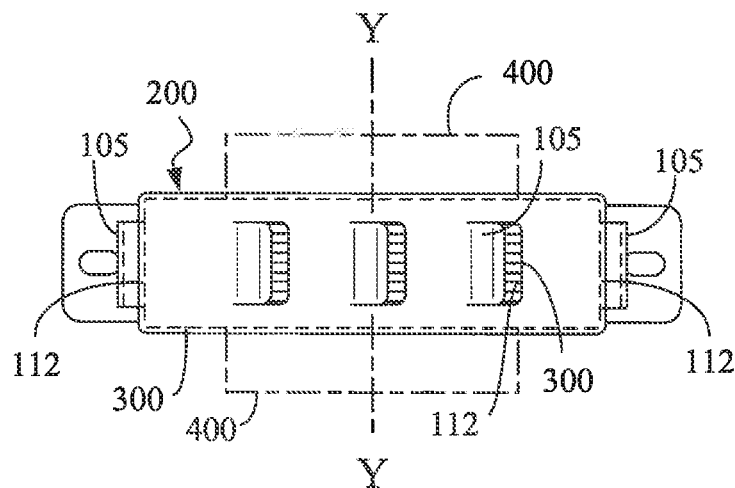
FIG. 35 is a top view of FIG. 34.

FIG. 35 is a top view of FIG. 34.

Figure 36:
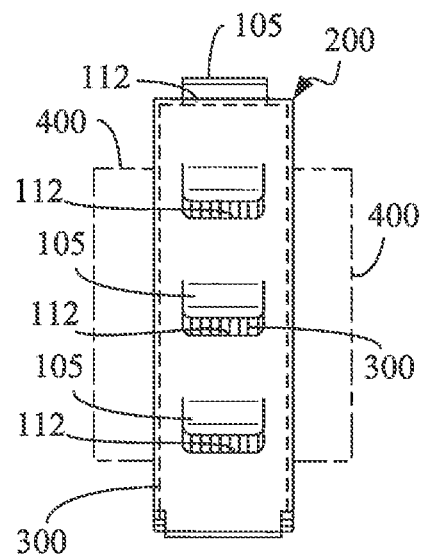
FIG. 36 is a side view of FIG. 34.

FIG. 36 is a side view of FIG. 34.

As shown from FIG. 34 to FIG. 36, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with a plurality of the longitudinal (Y-Y) semi-bridge-type heat dissipation fins (105) and the adjacent longitudinal (Y-Y) jointly-formed heat dissipation holes (112), so that the heat dissipation performance to the ambient gaseous or liquid environment can be enhanced.

Figure 37:
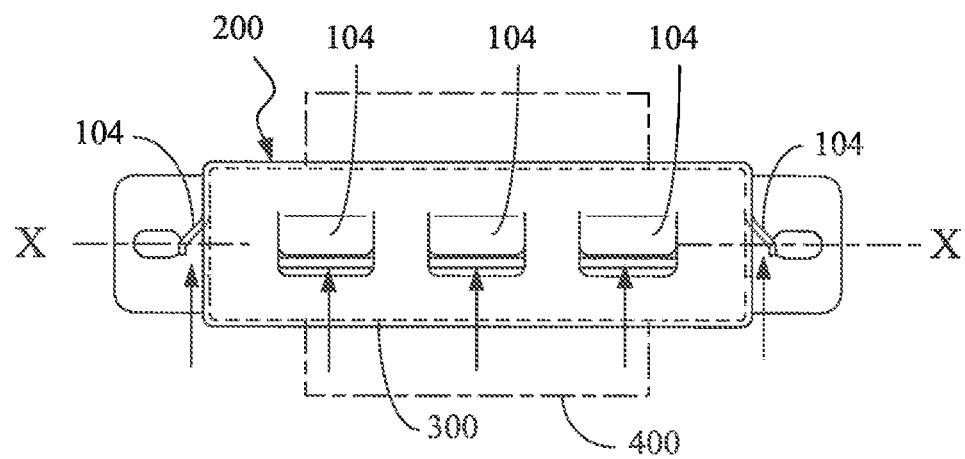
FIG. 37 is a schematic view showing the frame device (200) being formed with the transversal (X-X) semi-bridge-type heat dissipation fins (104) arranged at the same side and the adjacent transversal (X-X) jointly-formed heat dissipation holes (111) according to one embodiment of the present invention.

As shown in FIG. 31 to FIG. 36, the arranging means of the semi-bridge-type heat dissipation fins disclosed in the frame device of iron core of static electrical machine having outwardly-extended heat dissipation fin and/or heat dissipation hole provided by the present invention include being arranged at the same side or being staggeringly arranged at different sides. Detailed illustrations are provided as followings:

FIG. 37 is a front view showing the frame device (200) being formed with the transversal (X-X) semi-bridge-type heat dissipation fins (104) arranged at the same side and the adjacent transversal (X-X) jointly-formed heat dissipation holes (111) according to one embodiment of the present invention.

As shown in FIG. 37, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the plural transversal (X-X) semi-bridge-type heat dissipation fins (104) and the adjacent transversal (X-X) jointly-formed heat dissipation holes (111), and the adjacent transversal (X-X) semi-bridge-type heat dissipation fins (104) are arranged at the same side, so that the heat dissipation performance to the ambient gaseous or liquid environment can be enhanced.

Figure 38:
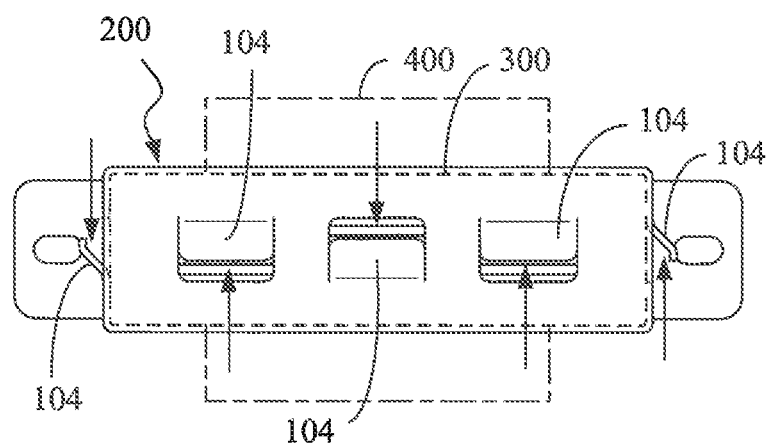
FIG. 38 is a schematic view showing the frame device (200) being formed with the transversal (X-X) semi-bridge-type heat dissipation fins (104) staggeringly arranged at different sides and the adjacent transversal (X-X) jointly-formed heat dissipation holes (111) according to one embodiment of the present invention.

FIG. 38 is a front view showing the frame device (200) being formed with the transversal (X-X) semi-bridge-type heat dissipation fins (104) staggeringly arranged at different sides and the adjacent transversal (X-X) jointly-formed heat dissipation holes (111) according to one embodiment of the present invention.

As shown in FIG. 38, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the plural transversal (X-X) semi-bridge-type heat dissipation fins (104) and the adjacent transversal (X-X) jointly-formed heat dissipation holes (111), and the adjacent transversal (X-X) semi-bridge-type heat dissipation fins (104) are staggeringly arranged at different sides, so that the heat dissipation performance to the ambient gaseous or liquid environment can be enhanced.

FIG. 39 is a front view showing the frame device (200) being formed with the at least one transversal (X-X) semi-bridge-type heat dissipation fin (104) arranged at the same side and as multiple rows and the adjacent transversal (X-X) jointly-formed heat dissipation holes (111) according to an eleventh embodiment of the present invention.

FIG. 40 is a top view of FIG. 39.

FIG. 41 is a side view of FIG. 39.

As shown from FIG. 39 to FIG. 41, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the at least one transversal (X-X) semi-bridge-type heat dissipation fin (104) arranged at the same side and as multiple rows and the adjacent transversal (X-X) jointly-formed heat dissipation hole (111), so that the heat dissipation performance to the ambient gaseous or liquid environment can be enhanced.

FIG. 42 is a front view showing the frame device (200) being formed the at least one transversal (X-X) semi-bridge-type heat dissipation fin (104) arranged at different sides and as multiple rows and the adjacent transversal (X-X) jointly-formed heat dissipation hole (111) according to a twelfth embodiment of the present invention.

FIG. 43 is a top view of FIG. 42.

FIG. 44 is a side view of FIG. 42.

As shown from FIG. 42 to FIG. 44, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the at least one transversal (X-X) semi-bridge-type heat dissipation fin (104) arranged at different sides and as multiple rows and the adjacent transversal (X-X) jointly-formed heat dissipation hole (111), so that the heat dissipation performance to the ambient gaseous or liquid environment can be enhanced.

Figures 45, 47:
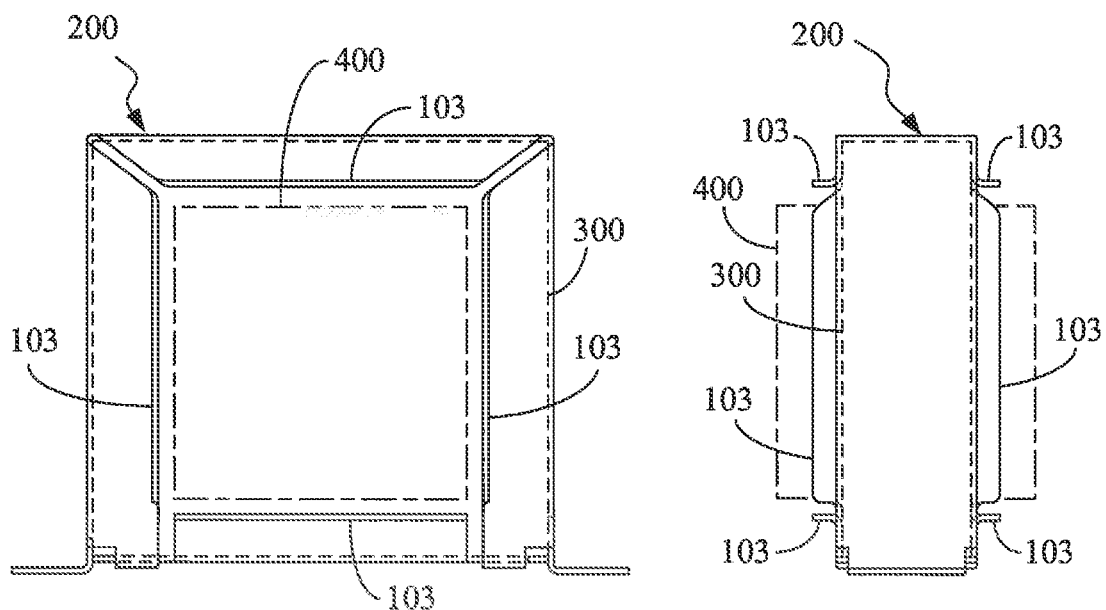
FIG. 45 is a front view showing at least one of outer edges of the adjacent surfaces between the frame device (200) and the iron core of the static electrical machine being formed with an outwardly-bent-from-outer-edge heat dissipation fin (103) according to a thirteenth embodiment of the present invention.
FIG. 47 is a side view of FIG. 45.

According to the present invention, the frame device of iron core of static electrical machine having outwardly-extended heat dissipation fin and/or heat dissipation hole can be provided with another characteristic which is that an outer edge of at least one of the adjacent surfaces between the frame device (200) and the iron core of the static electrical machine can be formed with an outwardly-bent-from-outer-edge heat dissipation fin (103). Detailed illustrations are provided as followings:

FIG. 45 is a front view showing at least one of the outer edges of the adjacent surfaces between the frame device (200) and the iron core of the static electrical machine being formed with an outwardly-bent-from-outer-edge heat dissipation fin (103) according to a thirteenth embodiment of the present invention.

Figure 46:
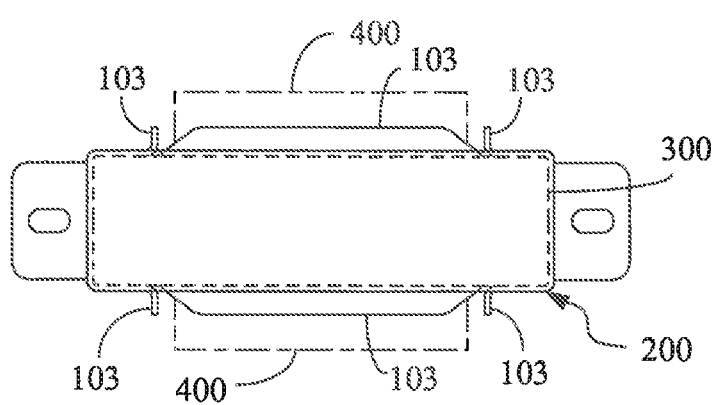
FIG. 46 is a top view of FIG. 45.

FIG. 46 is a top view of FIG. 45.

FIG. 47 is a side view of FIG. 45.

As shown from FIG. 45 to FIG. 47, take the frame device (200) disposed at the outer periphery of the iron core, structured by the iron core (300) with the magnetic loops formed as the square-like member or the rectangular member, of the static electrical machine as an example, the characteristic is that at least one of the outer edges of the adjacent surfaces between the frame device (200) and the iron core of the static electrical machine, which are the top surface, the front surfaces, the left surface, the right surface, the rear surfaces and bottom surface, is formed with the outwardly-bent-from-outer-edge heat dissipation fin (103), so that the heat dissipation performance to the ambient gaseous or liquid environment can be enhanced.

Figure 48:
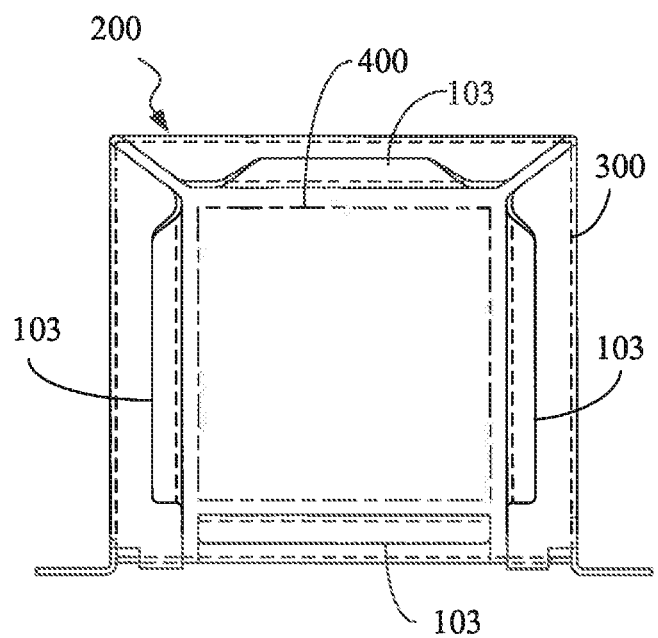
FIG. 48 is a front view showing at least one of the outer edges of the adjacent surfaces between the frame device (200) and the iron core of the static electrical machine being formed with the outwardly-bent-from-outer-edge heat dissipation fin (103) in a multi-bending structural status according to a fourteenth embodiment of the present invention.

FIG. 48 is a front view showing at least one of the outer edges of the adjacent surfaces between the frame device (200) and the iron core of the static electrical machine being formed with the outwardly-bent-from-outer-edge heat dissipation fin (103) in a multi-bending structural status according to a fourteenth embodiment of the present invention.

Figure 49:
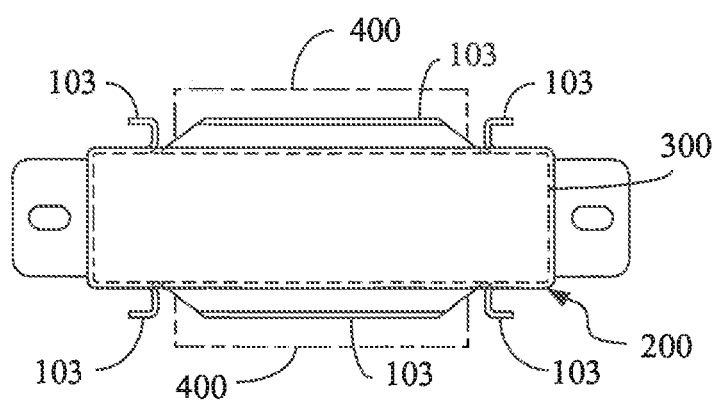
FIG. 49 is a top view of FIG. 48.

FIG. 49 is a top view of FIG. 48.

Figure 50:
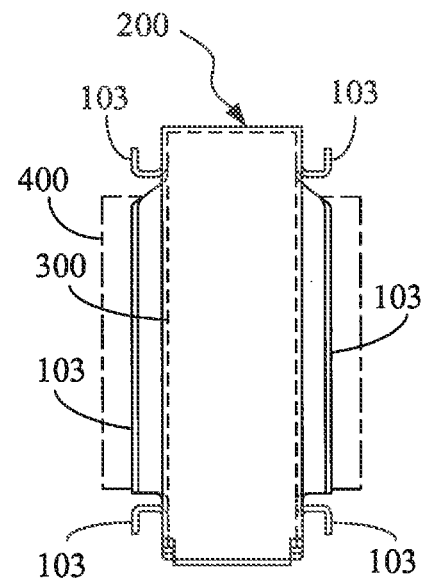
FIG. 50 is a side view of FIG. 48.

FIG. 50 is a side view of FIG. 48.

As shown from FIG. 48 to FIG. 50, take the frame device (200) disposed at the outer periphery of the iron core, structured by the iron core (300) with the magnetic loops formed as the square-like member or the rectangular member, of the static electrical machine as an example, the characteristic is that at least one of the outer edges of the adjacent surfaces between the frame device (200) and the iron core of the static electrical machine, which are the top surface, the front surfaces, the left surface, the right surface, the rear surfaces and bottom surface, is formed with the outwardly-bent-from-outer-edge heat dissipation fin (103) in the multi-bending structural status for further increasing the heat dissipation area, so that the heat dissipation performance to the ambient gaseous or liquid environment can be enhanced.

FIG. 51 is a front view showing the frame device (200) being formed with the longitudinal (Y-Y) bridge-type heat dissipation fins (102) and the adjacent longitudinal (Y-Y) jointly-formed heat dissipation holes (112), and at least one of the outer edges of the adjacent surfaces between the frame device (200) and the iron core of the static electrical machine being formed with the outwardly-bent-from-outer-edge heat dissipation fin (103) in a multi-bending structural status according to a fifteenth embodiment of the present invention.

FIG. 52 is a top view of FIG. 51.

FIG. 53 is a side view of FIG. 51.

As shown from FIG. 51 to FIG. 53, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the longitudinal (Y-Y) bridge-type heat dissipation fins (102) and the adjacent longitudinal (Y-Y) jointly-formed heat dissipation holes (112), and at least one of the outer edges of the adjacent surfaces between the frame device (200) and the iron core of the static electrical machine, which are top surface, the front surfaces, the left surface, the right surface, the rear surfaces and bottom surface, is formed with the outwardly-bent-from-outer-edge heat dissipation fin (103) in the multi-bending structural status for further increasing the heat dissipation area, so that the heat dissipation performance to the ambient gaseous or liquid environment can be enhanced.

Figure 54:
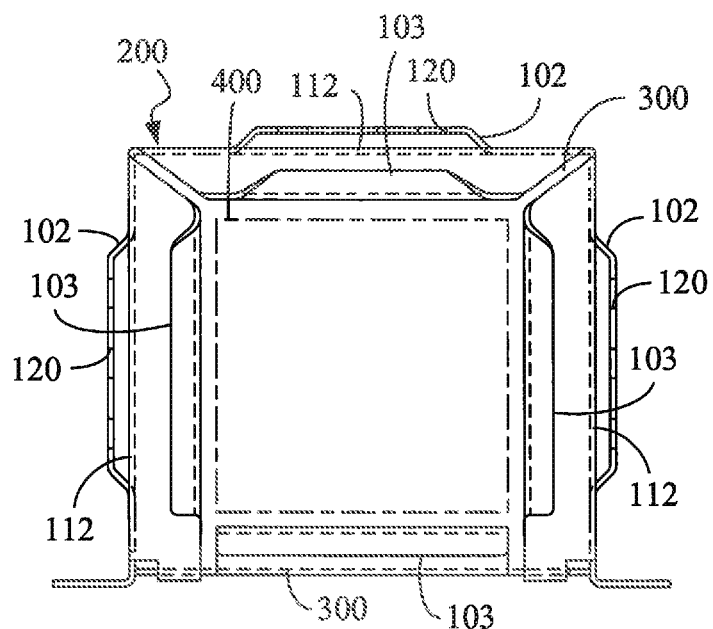
FIG. 54 is a front view showing the frame device (200) being formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) being respectively formed with the at least one flow discharging hole (120), and at least one of the outer edges of the adjacent surfaces between the frame device (200) and the iron core of the static electrical machine being formed with the outwardly-bent-from-outer-edge heat dissipation fin (103) in a multi-bending structural status according to a sixteenth embodiment of the present invention.

FIG. 54 is a front view showing the frame device (200) being formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) being respectively formed with the at least one flow discharging hole (120), and at least one of the outer edges of the adjacent surfaces between the frame device (200) and the iron core of the static electrical machine being formed with the outwardly-bent-from-outer-edge heat dissipation fin (103) in a multi-bending structural status according to a sixteenth embodiment of the present invention.

Figure 55:
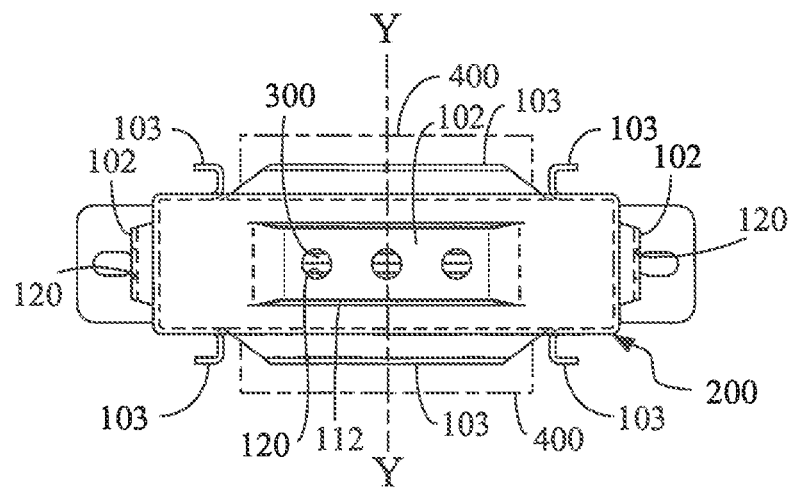
FIG. 55 is a top view of FIG. 54.

FIG. 55 is a top view of FIG. 54.

Figure 56:
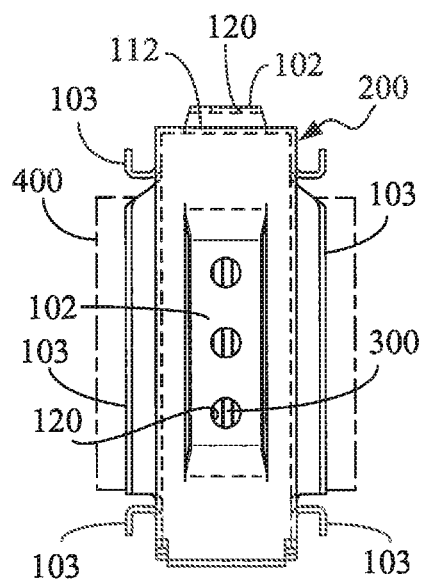
FIG. 56 is a side view of FIG. 54.

FIG. 56 is a side view of FIG. 54.

As shown from FIG. 54 to FIG. 56, take the frame device (200) disposed at the outer periphery of the iron core, structured by the iron core (300) with the magnetic loops formed as the square-like member or the rectangular member, of the static electrical machine as an example, the characteristic is that at least one of the top surface, the front surfaces, the left surface, the right surface, the rear surfaces and bottom surface of the frame device (200) is formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) are respectively formed with the at least one flow discharging hole (120), and at least one of the outer edges of the adjacent surfaces between the frame device (200) and the iron core of the static electrical machine, which are top surface, the front surfaces, the left surface, the right surface, the rear surfaces and bottom surface, is formed with the outwardly-bent-from-outer-edge heat dissipation fin (103) in the multi-bending structural status for further increasing the heat dissipation area, so that the heat dissipation performance to the ambient gaseous or liquid environment can be enhanced.

Figure 57:
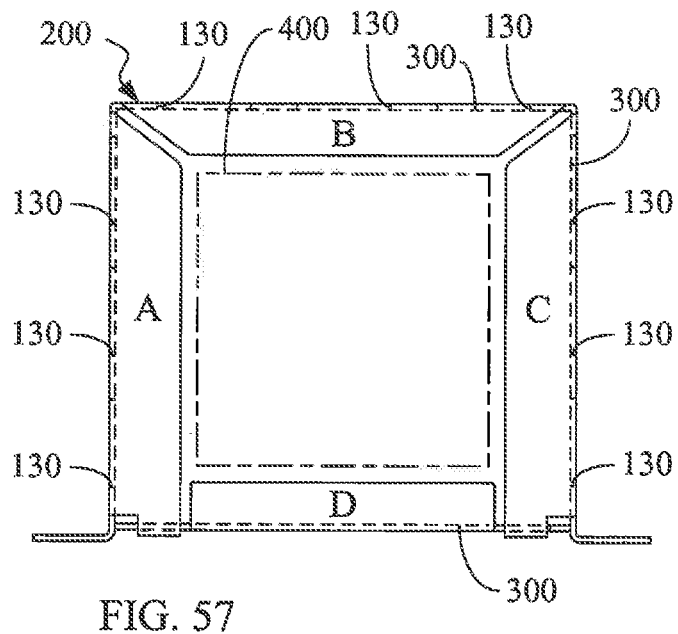
FIG. 57 is a front view showing at least one of the adjacent surfaces between the frame device (200) of the iron core of the static electrical machine and the iron core (300) with the magnetic loops being formed with a rectangular heat dissipation hole (130) allowing the iron core (300) with the magnetic loops to directly dissipate heat to the exterior according to one embodiment of the present invention.

According to the frame device of iron core of static electrical machine having outwardly-extended heat dissipation fin and/or heat dissipation hole provided by the present invention, besides the transversal (X-X) bridge-type heat dissipation fin (101) or transversal (X-X) semi-bridge-type heat dissipation fin (104) and the adjacent transversal (X-X) jointly-formed heat dissipation hole (111), the longitudinal (Y-Y) bridge-type heat dissipation fin (102) or the longitudinal (Y-Y) semi-bridge-type heat dissipation fin (105) and the adjacent longitudinal (Y-Y) jointly-formed heat dissipation hole (112), the inclined bridge-type heat dissipation fin (106) and the adjacent inclined jointly-formed heat dissipation hole (116), and the V-shaped bridge-type heat dissipation fin (107) and the adjacent V-shaped jointly-formed heat dissipation hole (117) can be configured to provide a function of directly dissipating heat to the exterior to the iron core (300) with the magnetic loops, the present invention is further provided with a characteristic which is that at least one of the adjacent surfaces between the frame device (200) of the iron core of the static electrical machine and the iron core (300) with the magnetic loops can be formed with a heat dissipation hole (130) formed as a square-like member or a the rectangular member and allowing the iron core (300) with the magnetic loops to directly dissipate heat to the exterior. Detailed illustrations are provided as followings:

FIG. 57 is a front view showing at least one of the adjacent surfaces between the frame device (200) of the iron core of the static electrical machine and the iron core (300) with the magnetic loops being formed with a rectangular heat dissipation hole (130) allowing the iron core (300) with the magnetic loops to directly dissipate heat to the exterior according to one embodiment of the present invention.

Figure 58:
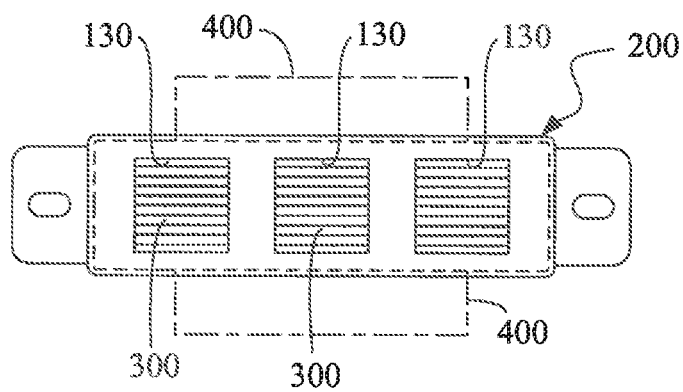
FIG. 58 is a top view of FIG. 57.

FIG. 58 is a top view of FIG. 57.

Figure 59:
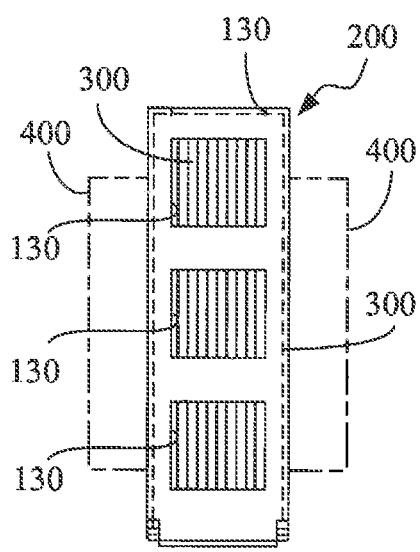
FIG. 59 is a side view of FIG. 57.

FIG. 59 is a side view of FIG. 57.

As shown from FIG. 57 to FIG. 59, take the frame device (200) disposed at the outer periphery of the iron core, structured by the iron core (300) with the magnetic loops formed as the square-like member or the rectangular member, of the static electrical machine as an example, the characteristic is that at least one of the adjacent surfaces between the frame device (200) of the iron core of the static electrical machine, which are the top surface, the front surface, the left surface, the right surface, the rear surface and bottom surface, and the iron core (300) with the magnetic loops is formed with the rectangular heat dissipation hole (130) allowing the iron core (300) with the magnetic loops to directly dissipate heat to the exterior, so that the heat dissipation performance to the ambient gaseous or liquid environment can be enhanced.

Figure 60:
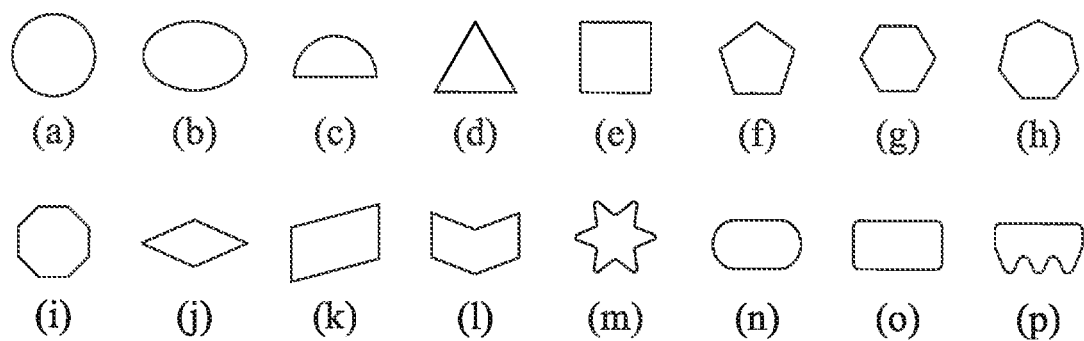
FIG. 60 is a schematic view showing various shapes applicable to the jointly-formed adjacent transversal (X-X) heat dissipation hole (111), the jointly-formed adjacent longitudinal (Y-Y) heat dissipation hole (112), the jointly-formed adjacent inclined heat dissipation hole (116), the adjacent V-shaped jointly-formed heat dissipation hole (117) and the heat dissipation hole (130) formed on the adjacent surfaces between the frame device (200) of the iron core of the static electrical machine and the iron core (300) with the magnetic loops and allowing the iron core (300) with the magnetic loops to directly dissipate heat to the exterior according to one embodiment of the present invention.

FIG. 60 is a schematic view showing various shapes applicable to the jointly-formed adjacent transversal (X-X) heat dissipation holes (111), the jointly-formed adjacent longitudinal (Y-Y) heat dissipation holes (112), the jointly-formed adjacent inclined heat dissipation hole (116), the adjacent V-shaped jointly-formed heat dissipation hole (117) and the heat dissipation hole (130) formed on the adjacent surfaces between the frame device (200) of the iron core of the static electrical machine and the iron core (300) with the magnetic loops and allowing the iron core (300) with the magnetic loops to directly dissipate heat to the exterior according to one embodiment of the present invention.

As shown in FIG. 60, take the frame device (200) disposed at the outer periphery of the iron core, structured by the iron core (300) with the magnetic loops formed as the square-like member or the rectangular member, of the static electrical machine as an example, the characteristic is that at least one of the adjacent surfaces between the frame device (200) of the iron core of the static electrical machine and the iron core (300) with the magnetic loops is formed with a dissipation hole having various arc-like shapes and/or a polygonal heat dissipation hole, for example the transversal (X-X) jointly-formed heat dissipation hole (111), the longitudinal (Y-Y) jointly-formed heat dissipation hole (112), the inclined jointly-formed heat dissipation hole (116), the V-shaped jointly-formed heat dissipation hole (117) and the heat dissipation hole (130) includes a hole-like shape or a slot-like shape such as: (a) a round dissipation hole; (b) an oval dissipation hole; (c) semi-round dissipation hole; (d) triangular dissipation hole; (e) rectangular dissipation hole; (f) a pentagonal dissipation hole; (g) a hexagonal dissipation hole; (h) a heptagonal dissipation hole; (i) an octagonal dissipation hole; (j) a rhombus dissipation hole; (k) an inclined dissipation hole; (l) a V-shaped dissipation hole; (m) a star-like dissipation hole; (n) a rectangular oval-slot-like dissipation hole with two sides being in an convex arc-shaped status; (o) a rectangular slot-like dissipation hole; (p) a dissipation hole having at least one side formed in a teeth-like status; or other dissipation holes formed with different geometrical shapes, and the dissipation hole disclosed in the present invention is formed through at least one of the above-mentioned shapes and statuses; what shall be addressed is that the above-mentioned (a) to (p) are merely served for illustrations, and other geometrical shapes shall be within the scope of the present invention.

According to the present invention, the characteristic of the frame device of iron core of static electrical machine having outwardly-extended heat dissipation fin and/or heat dissipation hole is that the frame device (200) formed with the outwardly-extended heat dissipation fin and/or the heat dissipation holeallowing heat to the directly dissipate to the exterior is able to configure an optimized structure for enhancing the heat transferring performance of the iron core (300) with the magnetic loops to the ambient gaseous or liquid environment, wherein:

the outwardly-extended heat dissipation fin and the heat dissipation hole include one or more than one of the followings:

(1) transversal (X-X) bridge-type heat dissipation fin (101);

(2) longitudinal (Y-Y) bridge-type heat dissipation fin (102);

(3) outwardly-bent-from-outer-edge heat dissipation fin (103);

(4) transversal (X-X) semi-bridge-type heat dissipation fin (104);

(5) longitudinal (Y-Y) semi-bridge-type heat dissipation fin (105);

(6) inclined bridge-type heat dissipation fin (106);

(7) V-shaped bridge-type heat dissipation fin (107);
(8) transversal (X-X) jointly-formed heat dissipation hole (111);
(9) longitudinal (Y-Y) jointly-formed heat dissipation hole (112);
(10) inclined jointly-formed heat dissipation hole (116);
(11) V-shaped jointly-formed heat dissipation hole (117); and
(12) heat dissipation hole (130) formed on the adjacent surfaces between the frame device (200) and the iron core (300) with the magnetic loops and allowing the iron core (300) with the magnetic loops to directly dissipate heat to the exterior.

According to the frame device of iron core of static electrical machine having outwardly-extended heat dissipation fin and/or heat dissipation hole provided by the present invention, one or more than one of the above-mentioned heat dissipation structure can be disposed on at least one of the six surfaces, which are the top surface, the front surfaces, the left surface, the right surface, the rear surfaces and the bottom surface, of the frame device (200) arranged at the outer periphery of the iron core (300) with the magnetic loops of the static electrical machine with respect to the actual needs and the actual required quantity. Detailed illustrations are provided as followings, but what shall be addressed is that the followings are merely served for illustrations and shall not be deemed as a limitation to the structural configuration and the quantity of the outwardly-extended heat dissipation fin and/or the shape and the quantity of the heat dissipation hole.

Figure 61:
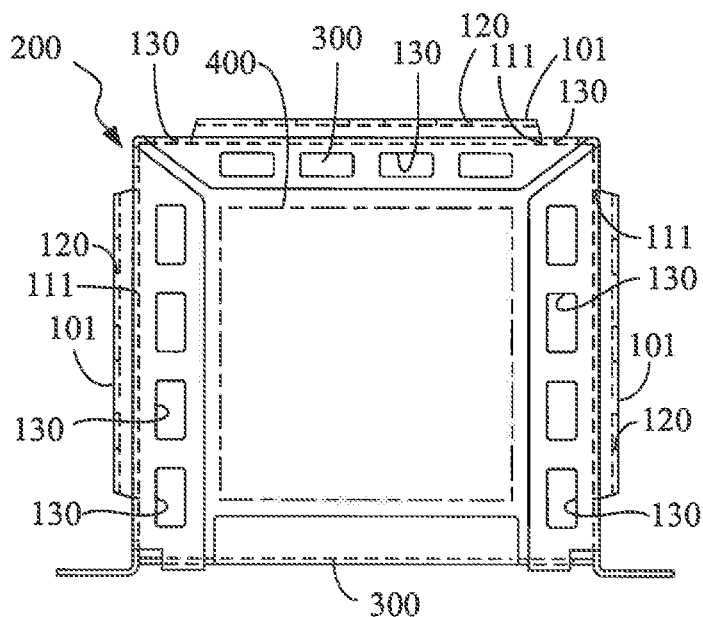
FIG. 61 is a front view showing the frame device (200) being formed with the transversal (X-X) bridge-type heat dissipation fins (101) and the adjacent transversal (X-X) jointly-formed heat dissipation holes (111), the transversal (X-X) bridge-type heat dissipation fins (101) being respectively formed with the at least one flow discharging hole (120), and the adjacent surfaces between the frame device (200) and the iron (300) with the magnetic loops being formed with the heat dissipation holes (130) allowing the iron core (300) with the magnetic loops to directly dissipate heat to the exterior according to a seventeenth embodiment of the present invention.

FIG. 61 is a front view showing the frame device (200) being formed with the transversal (X-X) bridge-type heat dissipation fins (101) and the adjacent transversal (X-X) jointly-formed heat dissipation holes (111), the transversal (X-X) bridge-type heat dissipation fins (101) being respectively formed with the at least one flow discharging hole (120), and the adjacent surfaces between the frame device (200) and the iron (300) with the magnetic loops being formed with the heat dissipation hole (130) allowing the iron core (300) with the magnetic loops to directly dissipate heat to the exterior according to a seventeenth embodiment of the present invention.

Figure 63:
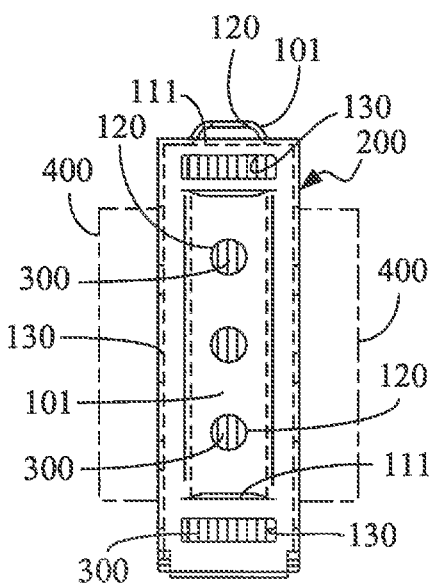
FIG. 63 is a side view of FIG. 61.
Figure 62:
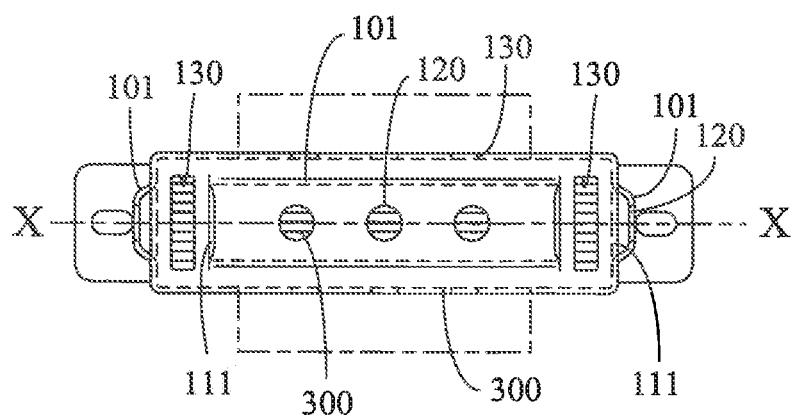
FIG. 62 is a top view of FIG. 61.

FIG. 62 is a top view of FIG. 61.
FIG. 63 is a side view of FIG. 61.

As shown from FIG. 61 to FIG. 63, take the frame device (200) disposed at the outer periphery of the iron core, structured by the iron core (300) with the magnetic loops formed as the square-like member or the rectangular member, of the static electrical machine as an example, the characteristic is that the frame device (200) is formed with the transversal (X-X) bridge-type heat dissipation fins (101) and the adjacent transversal (X-X) jointly-formed heat dissipation holes (111), the transversal (X-X) bridge-type heat dissipation fins (101) are respectively formed with the at least one flow discharging hole (120), and the adjacent surfaces between the frame device (200) and the iron (300) with the magnetic loops are formed with the heat dissipation hole (130) allowing the iron core (300) with the magnetic loops to directly dissipate heat to the exterior, so that the heat dissipation performance to the ambient gaseous or liquid environment can be enhanced.

Figure 64:
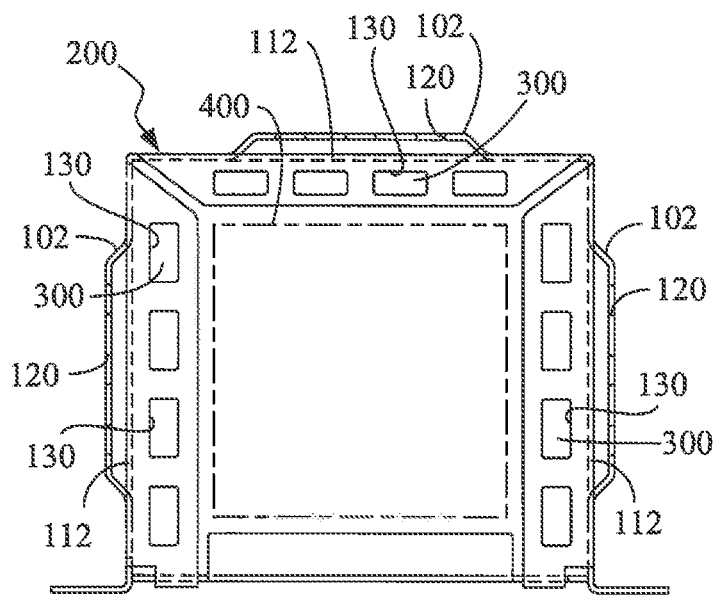
FIG. 64 is a front view showing the frame device (200) being formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) being respectively formed with the at least one flow discharging hole (120), and the adjacent surfaces between the frame device (200) and the iron (300) with the magnetic loops being formed with the heat dissipation holes (130) allowing the iron core (300) with the magnetic loops to directly dissipate heat to the exterior according to an eighteenth embodiment of the present invention.

FIG. 64 is a front view showing the frame device (200) being formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) being respectively formed with the at least one flow discharging hole (120), and the adjacent surfaces between the frame device (200) and the iron (300) with the magnetic loops being formed with the heat dissipation hole (130) allowing the iron core (300) with the magnetic loops to directly dissipate heat to the exterior according to an eighteenth embodiment of the present invention.

Figure 66:
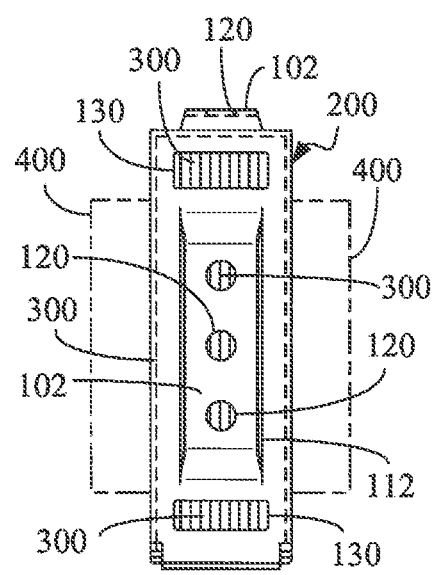
FIG. 66 is a side view of FIG. 64.
Figure 65:
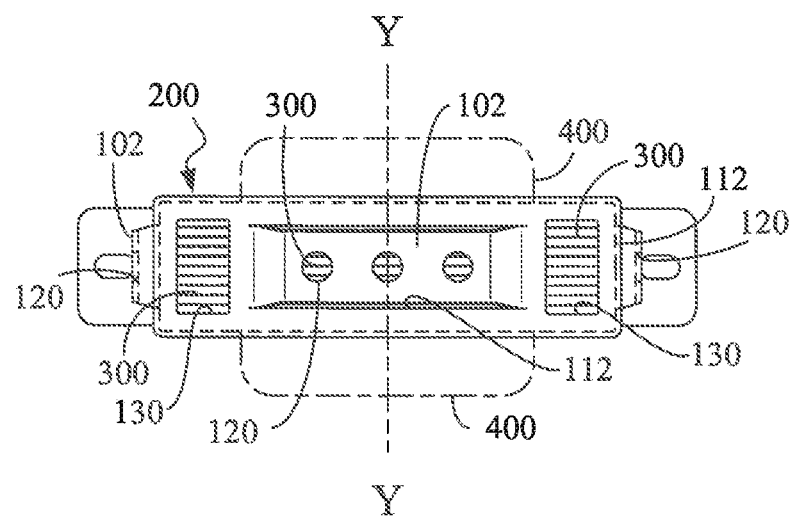
FIG. 65 is a top view of FIG. 64.

FIG. 65 is a top view of FIG. 64.
FIG. 66 is a side view of FIG. 64.

As shown from FIG. 64 to FIG. 66, take the frame device (200) disposed at the outer periphery of the iron core, structured by the iron core (300) with the magnetic loops formed as the square-like member or the rectangular member, of the static electrical machine as an example, the characteristic is that the frame device (200) is formed with the longitudinal (Y-Y) bridge-type heat dissipation fins (102) and the adjacent longitudinal (Y-Y) jointly-formed heat dissipation holes (112), the longitudinal (Y-Y) bridge-type heat dissipation fins (102) are respectively formed with the at least one flow discharging hole (120), and the adjacent surfaces between the frame device (200) and the iron (300) with the magnetic loops are formed with the heat dissipation hole (130) allowing the iron core (300) with the magnetic loops to directly dissipate heat to the exterior, so that the heat dissipation performance to the ambient gaseous or liquid environment can be enhanced.

Figure 67:
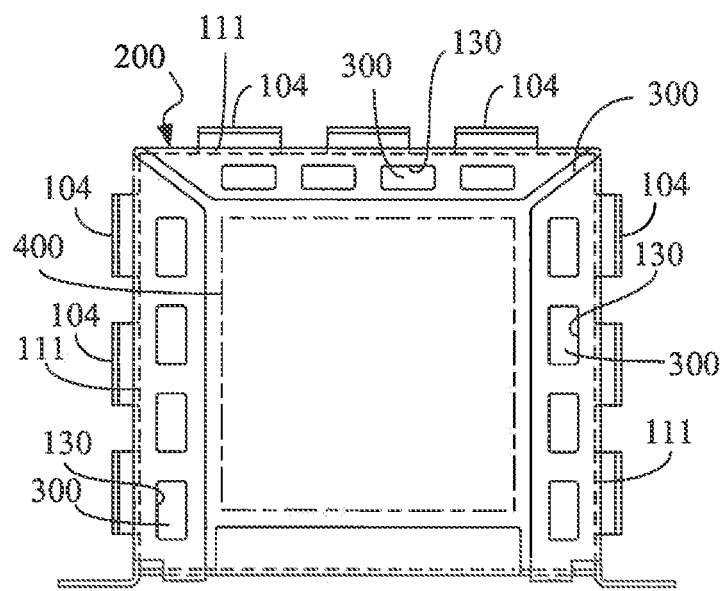
FIG. 67 is a front view showing the frame device (200) being formed with the at least one transversal (X-X) semi-bridge-type heat dissipation fin (104) and the adjacent transversal (X-X) jointly-formed heat dissipation hole (111), and the adjacent surfaces between the frame device (200) and the iron (300) with the magnetic loops being formed with the heat dissipation hole (130) allowing the iron core (300) with the magnetic loops to directly dissipate heat to the exterior according to a nineteenth embodiment of the present invention.

FIG. 67 is a front view showing the frame device (200) being formed with the at least one transversal (X-X) semi-bridge-type heat dissipation fin (104) and the adjacent transversal (X-X) jointly-formed heat dissipation hole (111), and the adjacent surfaces between the frame device (200) and the iron (300) with the magnetic loops being formed with the heat dissipation hole (130) allowing the iron core (300) with the magnetic loops to directly dissipate heat to the exterior according to a nineteenth embodiment of the present invention.

Figure 69:
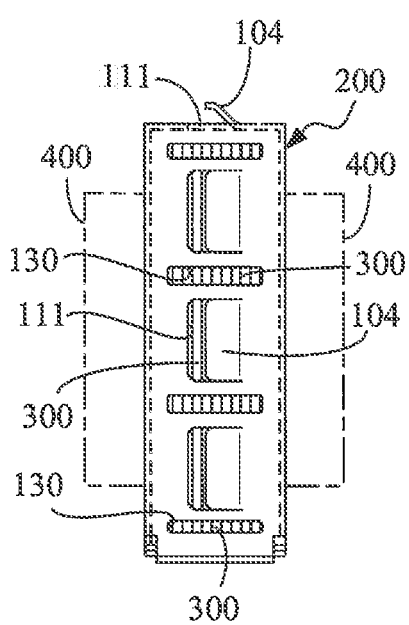
FIG. 69 is a side view of FIG. 67.
Figure 68:
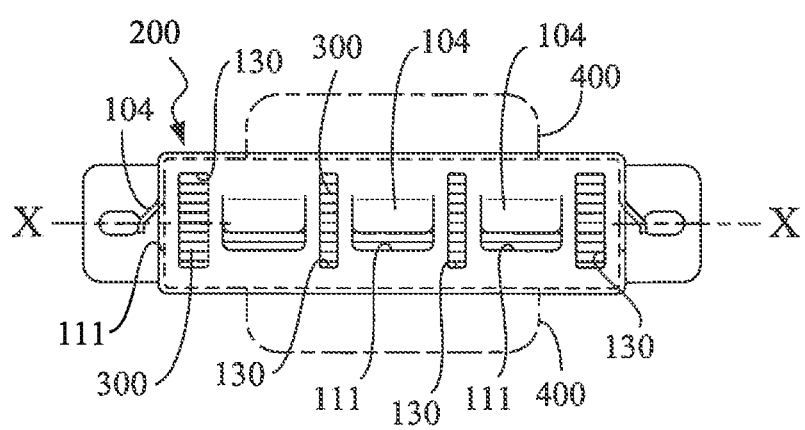
FIG. 68 is a top view of FIG. 67.

FIG. 68 is a top view of FIG. 67.
FIG. 69 is a side view of FIG. 67.

As shown from FIG. 67 to FIG. 69, take the frame device (200) disposed at the outer periphery of the iron core, structured by the iron core (300) with the magnetic loops formed as the square-like member or the rectangular member, of the static electrical machine as an example, the characteristic is that the frame device (200) is formed with the at least one transversal (X-X) semi-bridge-type heat dissipation fin (104) and the adjacent transversal (X-X) jointly-formed heat dissipation hole (111), and the adjacent surfaces between the frame device (200) and the iron (300) with the magnetic loops are formed with the heat dissipation hole (130) allowing the iron core (300) with the magnetic loops to directly dissipate heat to the exterior, so that the heat dissipation performance to the ambient gaseous or liquid environment can be enhanced.

Figure 70:
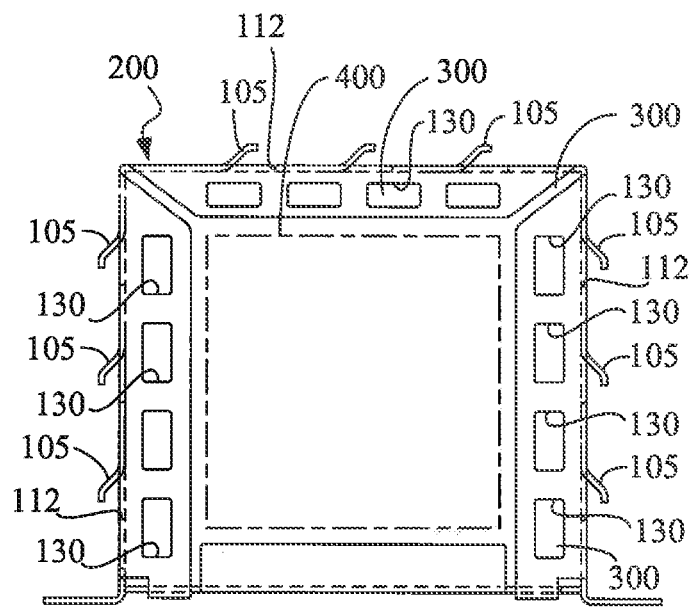
FIG. 70 is a front view showing the frame device (200) being formed with the at least one longitudinal (Y-Y) semi-bridge-type heat dissipation fin (105) and the adjacent longitudinal (Y-Y) jointly-formed heat dissipation hole (112), and the adjacent surfaces between the frame device (200) and the iron (300) with the magnetic loops being formed with the heat dissipation hole (130) in a rectangular slot-like status and allowing the iron core (300) with the magnetic loops to directly dissipate heat to the exterior according to a twentieth embodiment of the present invention.

FIG. 70 is a front view showing the frame device (200) being formed with the at least one longitudinal (Y-Y) semi-bridge-type heat dissipation fin (105) and the adjacent longitudinal (Y-Y) jointly-formed heat dissipation hole (112), and the adjacent surfaces between the frame device (200) and the iron (300) with the magnetic loops being formed with the heat dissipation hole (130) in a rectangular slot-like status and allowing the iron core (300) with the magnetic loops to directly dissipate heat to the exterior according to a twentieth embodiment of the present invention.

Figure 72:
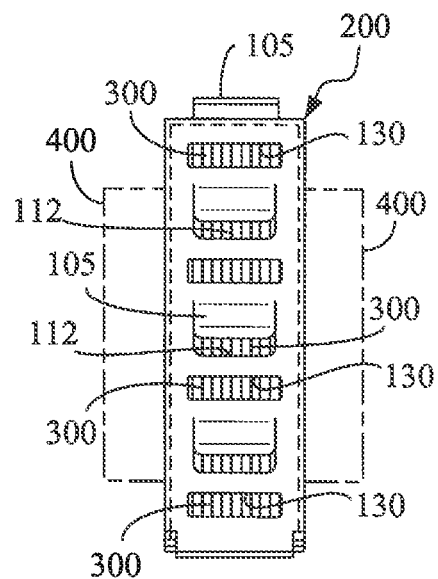
FIG. 72 is a side view of FIG. 70.
Figure 71:
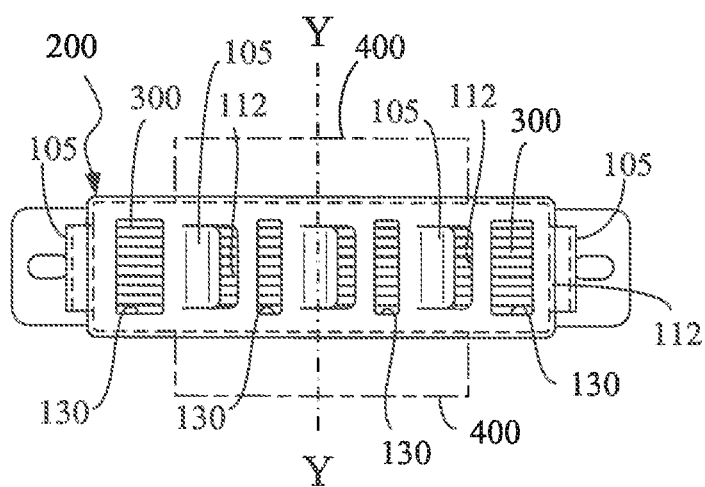
FIG. 71 is a top view of FIG. 70.

FIG. 71 is a top view of FIG. 70.
FIG. 72 is a side view of FIG. 70.

As shown from FIG. 70 to FIG. 72, take the frame device (200) disposed at the outer periphery of the iron core, structured by the iron core (300) with the magnetic loops formed as the square-like member or the rectangular member, of the static electrical machine as an example, the characteristic is that the frame device (200) is formed with the at least one longitudinal (Y-Y) semi-bridge-type heat dissipation fin (105) and the adjacent longitudinal (Y-Y) jointly-formed heat dissipation hole (112), and the adjacent surfaces between the frame device (200) and the iron (300) with the magnetic loops are formed with the heat dissipation hole (130) in the rectangular slot-like status and allowing the iron core (300) with the magnetic loops to directly dissipate heat to the exterior, so that the heat dissipation performance to the ambient gaseous or liquid environment can be enhanced.

According to the present invention, the application of the frame device of iron core of static electrical machine having outwardly-extended heat dissipation fin and/or heat dissipation hole includes the frame device of the iron core of the static electrical machine having the outwardly-extended heat dissipation fin and/or the heat dissipation hole and made of a thermal conductive material being served to clamp and fasten a winding structure consisted of a coil winding set, a BOBBIN, conducting pins and leading wires or a static electrical machine and consisted of an iron core with magnetic loops and installed in a gaseous or a liquid working environment, such as a transformer, an inductor, an electromagnet or a linear displacing actuator adopting the electromagnetic effect, or a device adopting the electromagnetic effect such as a device capable of converting kinetic energy generated via linear and reciprocal displacements into electric energy for power generation, so that the static electrical machine with the frame device of the iron core is outwardly-extended with the heat dissipation fin and/or the heat dissipation hole, thereby enlarging the heat dissipation area to the gaseous or liquid environment and further enhancing the heat dissipation performance thereof.

Based on what has been disclosed above, advantages achieved by the frame device of iron core of static electrical machine having outwardly-extended heat dissipation fin and/or heat dissipation hole provided by the present invention are as followings: the frame device is formed with the outwardly-extended heat dissipation fin structure, and/or the jointly-formed heat dissipation hole arranged on the adjacent surfaces between the frame device and the iron core with the magnetic loops and/or the heat dissipation hole, thus the heat dissipation area, directly exposed to the gaseous or liquid environment, of the iron core with the magnetic loops of the static electrical machine can be enlarged; and moreover, the outwardly-extended heat dissipation fin structure can be served to enlarge the heat dissipation area to the exterior, thereby allowing the heat dissipation performance of the iron core with the magnetic loops, clamped and fastened by the frame device, to the gaseous or liquid environment to be further enhanced.

The invention claimed is:

1. A frame device for an iron core of a static electrical machine, comprising:
   at least one outwardly-extending heat dissipation fin extending outwardly from the frame device (200) for enlarging a heat dissipation area through which heat, generated by the iron core (300) forming magnetic loops and windings (400), is dissipated to an ambient gaseous or liquid environment of the static electrical machine,
   wherein the frame device (200) is fastened to and includes frame members that extend around a top, sides, and bottom of the iron core, each frame member extending in a length direction (X-X) and a width direction (Y-Y),
   wherein each said outwardly-extending heat dissipation fin bridges a corresponding hole in the at least one frame member and includes two sides extending parallel to a longitudinal axis of the heat dissipation fin, and two ends that extend transversely to the longitudinal axis, the at least one outwardly-extending heat dissipation fin being configured as at least one of the following:
   (1) a transverse bridge-type heat dissipation fin (101) in which the sides are joined to the at least one frame member to bridge the corresponding hole (111), the ends are open in the length direction (X-X), and the transverse bridge-type heat dissipation fin (101) is incorporated with at least one flow discharging hole (120);
   (2) a longitudinal bridge-type heat dissipation fin (102) in which the ends are joined to the at least one frame member to bridge the corresponding hole (112), and the sides are open in the width direction (Y-Y);
   (3) a longitudinal bridge-type heat dissipation fin (102) in which the ends are joined to the at least one frame member to bridge the corresponding hole (112), and the sides are open in the width direction (Y-Y), and the longitudinal bridge-type heat dissipation fin (102) is incorporated with the at least one flow discharging hole (120);
   (4) an outwardly-bent-from-outer-edge heat dissipation fin (103) that is bent outwardly from an outer edge of the at least one frame member (A, B, C, D, I, J, K, L);
   (5) a transverse semi-bridge-type heat dissipation fin (104) in which only one of the sides along the length direction (X-X) is joined to the at least one frame member, with another of the sides and the two ends being separated from the at the least one frame member to form the corresponding hole (111);
   (6) a longitudinal semi-bridge-type heat dissipation fin (105) in which only one of the ends along the width direction (Y-Y) is joined to the at least one frame member, with another of the ends and the two sides being separated from the at least one frame member to form the corresponding hole (112);
   (7) an inclined bridge-type heat dissipation fin (106) in which the sides are joined to the at least one frame member and extend at a non-zero angle with respect to the length direction (X-X) and the width direction (Y-Y) of the at least one frame member to form the corresponding hole (116); and
   (8) a V-shaped bridge-type heat dissipation fin (107) in which the ends are joined to the at least one frame member to bridge the corresponding hole (117), the sides are open and have a V-shape.

2. A frame device as claimed in claim 1, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

3. A frame device as claimed in claim 1, wherein the at least one outwardly-extending heat dissipation fin includes at least two of said transverse bridge-type heat dissipation fin (101) in which each of the sides are joined to the at least one frame member and each of the ends are open.

4. A frame device as claimed in claim 1, wherein the transverse bridge-type heat dissipation fin (101) further has formed therein at least one flow discharging hole (120), and a surface of the frame device that is adjacent the transverse bridge-type heat dissipation fin has formed therein at least one square or rectangular heat dissipation hole (130).

5. A frame device as claimed in claim 1, wherein the at least one outwardly-extending heat dissipation fin is configured as said longitudinal bridge-type heat dissipation fin (102) in which the ends are joined to the at least one frame member and the sides are open.

6. A frame device as claimed in claim 5, wherein the at least one outwardly-extending heat dissipation fin includes at least two of said longitudinal bridge-type heat dissipation fin (102) in which each of the ends are joined to the at least one frame member and each of the sides are open.

7. A frame device as claimed in claim 5, wherein the longitudinal bridge-type heat dissipation fin (102) further has formed therein at least one flow discharging hole (120), and a surface of the frame device that is adjacent the longitudinal bridge-type heat dissipation fin has formed therein at least one square or rectangular heat dissipation hole (130).

8. A frame device as claimed in claim 5, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

9. A frame device as claimed in claim 1, wherein the at least one outwardly-extending heat dissipation fin includes at least two of said outwardly-bent-from-outer-edge heat dissipation fin (103) that is bent outwardly from plural outer edges of the at least one frame member.

10. A frame device as claimed in claim 9, wherein the outwardly-bent-from-outer-edge heat dissipation fin (103) further has formed therein at least one flow discharging hole (120), and a surface of the frame device that is adjacent the bridge-type heat dissipation fin has formed therein at least one square or rectangular heat dissipation hole (130).

11. A frame device as claimed in claim 9, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

12. A frame device as claimed in claim 1, wherein the at least one outwardly-extending heat dissipation fin is configured as said transverse semi-bridge-type heat dissipation fin (104) in which only one of the sides is joined to the at least one frame member, with another of the sides and the two ends being separated from the at the least one frame member.

13. A frame device as claimed in claim 12, wherein the at least one outwardly-extending heat dissipation fin includes at least two of said transverse semi-bridge-type heat dissipation fin (104) in which only one of the sides is joined to the at least one frame member.

14. A frame device as claimed in claim 13, wherein said frame members cover the top (E), bottom (H), and sides (F,G) of the iron core, and further extend around and partially covering front surfaces (A,B,C,D) and rear surfaces (I,J,K,L) of the iron core (300), and wherein the at least two transverse semi-bridge-type heat dissipation fins (104) are arranged on a same side of the iron core (300).

15. A frame device as claimed in claim 13, wherein said frame members cover the top (E), bottom (H), and sides (F,G) of the iron core, and further extend around and partially covering front surfaces (A,B,C,D) and rear surfaces (I,J,K,L) of the iron core (300), and wherein the at least two transverse semi-bridge-type heat dissipation fins (104) are staggeringly arranged on different sides of the iron core (300).

16. A frame device as claimed in claim 13, wherein said frame members cover the top (E), bottom (H), and sides (F,G) of the iron core, and further extend around and partially covering front surfaces (A,B,C,D) and rear surfaces (I,J,K,L) of the iron core (300), and wherein the at least two transverse semi-bridge-type heat dissipation fins are arranged in multiple rows on a same side of the iron core (300).

17. A frame device as claimed in claim 13, wherein said frame members cover the top (E), bottom (H), and sides (F,G) of the iron core, and further extend around and partially covering front surfaces (A,B,C,D) and rear surfaces (I,J,K,L) of the iron core (300), and wherein the at least two transverse semi-bridge-type heat dissipation fins are arranged in multiple rows on different sides of the iron core (300).

18. A frame device as claimed in claim 12, wherein the bridge-type heat dissipation fin (104) further has formed therein at least one flow discharging hole (120), and a surface of the frame device that is adjacent the bridge-type heat dissipation fin has formed therein at least one square or rectangular heat dissipation hole (130).

19. A frame device as claimed in claim 1, wherein the at least one outwardly-extending heat dissipation fin is configured as said longitudinal semi-bridge-type heat dissipation fin (105) in which only one of the ends is joined to the at least one frame member, with another of the ends and the two sides being separated from the at least one frame member.

20. A frame device as claimed in claim 19, wherein the at least one outwardly-extending heat dissipation fin includes at least two of said longitudinal semi-bridge-type heat dissipation fin (105) in which only one of the ends is joined to the at least one frame member.

21. A frame device as claimed in claim 19, wherein the longitudinal semi-bridge-type heat dissipation fin further has formed therein at least one flow discharging hole (120), and a surface of the frame device that is adjacent the longitudinal semi-bridge-type heat dissipation fin has formed therein at least one square or rectangular heat dissipation hole (130).

22. A frame device as claimed in claim 19, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

23. A frame device as claimed in claim 1, wherein the at least one outwardly-extending heat dissipation fin is configured as said inclined bridge-type heat dissipation fin (106) in which the sides extend at a non-zero angle with respect to the length direction (X-X) and the width direction (Y-Y) of the at least one frame member.

24. A frame device as claimed in claim 23, wherein the at least one outwardly-extending heat dissipation fin includes at least two of said inclined bridge-type heat dissipation fin (106) in which the sides extend at a non-zero angle with respect to the length direction (X-X) and the width direction (Y-Y) of the at least one frame member.

25. A frame device as claimed in claim 23, wherein the inclined bridge-type heat dissipation fin (106) further has formed therein at least one flow discharging hole (120), and a surface of the frame device that is adjacent the inclined bridge-type heat dissipation fin has formed therein at least one square or rectangular heat dissipation hole (130).

26. A frame device as claimed in claim 23, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

27. A frame device as claimed in claim 1, wherein the at least one outwardly-extending heat dissipation fin is configured as said V-shaped bridge-type heat dissipation fin (107) in which the sides have a V-shape and the ends are joined to the at least one frame member.

28. A frame device as claimed in claim 27, wherein the at least one outwardly-extending heat dissipation fin includes at least two of said V-shaped bridge-type heat dissipation fin (107) in which the sides have a V-shape.

29. A frame device as claimed in claim 27, wherein the V-shaped bridge-type heat dissipation fin (107) further has formed therein at least one flow discharging hole (120), and a surface of the frame device that is adjacent the V-shaped bridge-type heat dissipation fin has formed therein at least one square or rectangular heat dissipation hole (130).

30. A frame device as claimed in claim 27, wherein the frame device has a square or rectangular shape, respective said frame members covering the top (E), bottom (H), and sides (F,G) of the iron core, and further extending around and partially covering front surfaces (A,B,C,D) and rear surfaces (I,J,K,L) of the iron core (300).

31. A frame device as claimed in claim 1, wherein the at least one frame member is bent to extend around and partially cover front surfaces (A,B,C,D) and rear surfaces (I,J,K,L) of the iron core (300), and wherein the at least one frame member is further bent outwardly from outer edges of the at least one frame member to form a multi-bend outwardly-bent-from-outer-edge heat dissipation fin (103).

32. A frame device as claimed in claim 1, wherein:
the at least one outwardly-extending heat dissipation fin is configured as said longitudinal bridge-type heat dissipation fin (102) in which the ends are joined to the at least one frame member and the two sides along the width direction (Y-Y) are open, and
the at least one frame member is bent to extend around and partially cover front surfaces (A,B,C,D) and rear surfaces (I,J,K,L) of the iron core (300), and wherein the at least one frame member is further bent outwardly from outer edges of the at least one frame member to form a multi-bend outwardly-bent-from-outer-edge heat dissipation fin (103).

33. A frame device as claimed in claim 32, wherein:
the at least one flow discharging hole (120) is incorporated with the longitudinal bridge-type heat dissipation fin (102).

34. A frame device as claimed in claim 1, wherein:
the at least one outwardly-extending heat dissipation fin is configured as said transverse bridge-type heat dissipation fin (101) in which the ends are joined to the at least one frame member and the two sides along the length direction (X-X) are open, and
the at least one frame member is bent to extend around and partially cover front surfaces (A,B,C,D) and rear surfaces (I,J,K,L) of the iron core (300), and wherein
the at least one frame member is further bent outwardly from outer edges of the at least one frame member to form a multi-bend outwardly-bent-from-outer-edge heat dissipation fin (103);
the at least one flow discharging hole (120) is incorporated with the transverse bridge-type heat dissipation fin (101).

35. A frame device as claimed in claim 1, wherein:
the at least one outwardly-extending heat dissipation fin is configured as said longitudinal semi-bridge-type heat dissipation fin (105) in which only one of the ends along the width direction (Y-Y) is joined to the at least one frame member, with another of the ends and the two sides being separated from the at least one frame member to form the corresponding hole (112),
the at least one frame member is bent to extend around and partially cover front surfaces (A,B,C,D) and rear surfaces (I,J,K,L) of the iron core (300), and
the at least one frame member is further bent outwardly from outer edges of the at least one frame member to form a multi-bend outwardly-bent-from-outer-edge heat dissipation fin (103).

36. A frame device as claimed in claim 1, wherein:
the at least one outwardly-extending heat dissipation fin is configured as said transverse semi-bridge-type heat dissipation fin (104) in which only one of the sides along the width direction (X-X) is joined to the at least one frame member, with another of the sides and the two ends being separated from the at the least one frame member to form the corresponding hole (111), and
the at least one frame member is bent to extend around and partially cover front surfaces (A,B,C,D) and rear surfaces (I,J,K,L) of the iron core (300), and
the at least one frame member is further bent outwardly from outer edges of the at least one frame member to form a multi-bend outwardly-bent-from-outer-edge heat dissipation fin (103).

\* \* \* \* \*